(12) United States Patent
Hatada

(10) Patent No.: US 9,151,935 B2
(45) Date of Patent: Oct. 6, 2015

(54) ZOOM LENS AND IMAGE PICKUP APPARATUS INCLUDING THE SAME

(71) Applicant: Canon Kabushiki Kaisha, Tokyo (JP)

(72) Inventor: Takahiro Hatada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/765,107

(22) Filed: Feb. 12, 2013

(65) Prior Publication Data

US 2013/0208155 A1  Aug. 15, 2013

(30) Foreign Application Priority Data

Feb. 15, 2012  (JP) .................. 2012-030668

(51) Int. Cl.
  *G02B 15/14* (2006.01)
  *G02B 15/17* (2006.01)
(52) U.S. Cl.
  CPC ............. *G02B 15/14* (2013.01); *G02B 15/17* (2013.01)
(58) Field of Classification Search
  CPC ....... G02B 15/14; G02B 15/16; G02B 15/161
  USPC .......................... 359/676, 686, 687
  See application file for complete search history.

(56) References Cited

U.S. PATENT DOCUMENTS

| | | | |
|---|---|---|---|
| 5,764,421 A * | 6/1998 | Shimizu et al. | 359/689 |
| 2007/0229972 A1* | 10/2007 | Satori | 359/686 |
| 2009/0015938 A1* | 1/2009 | Harada | 359/676 |

FOREIGN PATENT DOCUMENTS

| | | |
|---|---|---|
| JP | 59-52215 A | 3/1984 |
| JP | 2009-086537 A | 4/2009 |

* cited by examiner

*Primary Examiner* — Darryl J Collins
(74) *Attorney, Agent, or Firm* — Canon USA, Inc., IP Division

(57) ABSTRACT

A zoom lens includes an imaging lens unit having a positive refractive power and provided nearest to an image-side end, and a focusing lens unit having a positive refractive power and provided on an object side of the imaging lens unit. A distance between the imaging lens unit and the focusing lens unit changes during zooming. The focusing lens unit moves during focusing. The imaging lens unit includes, at a position thereof nearest to an object-side end, a negative meniscus lens component that is concave on the object side thereof.

13 Claims, 21 Drawing Sheets

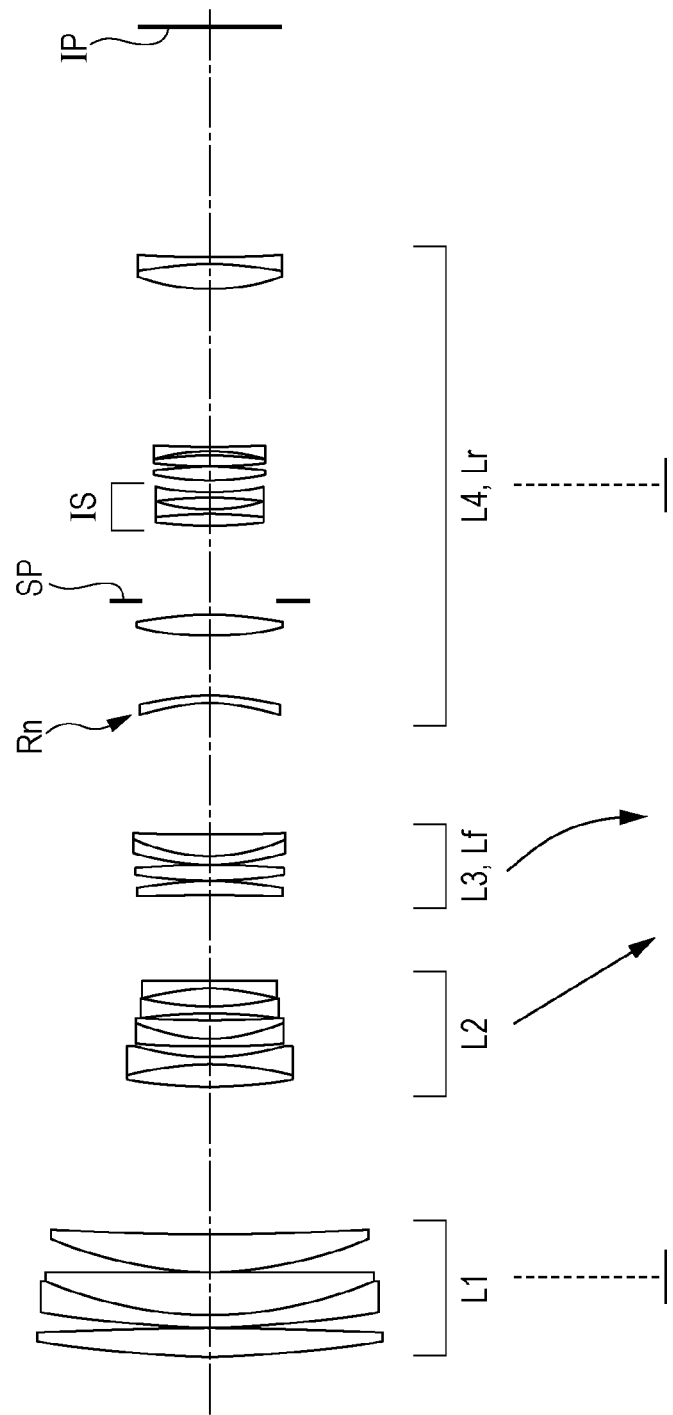

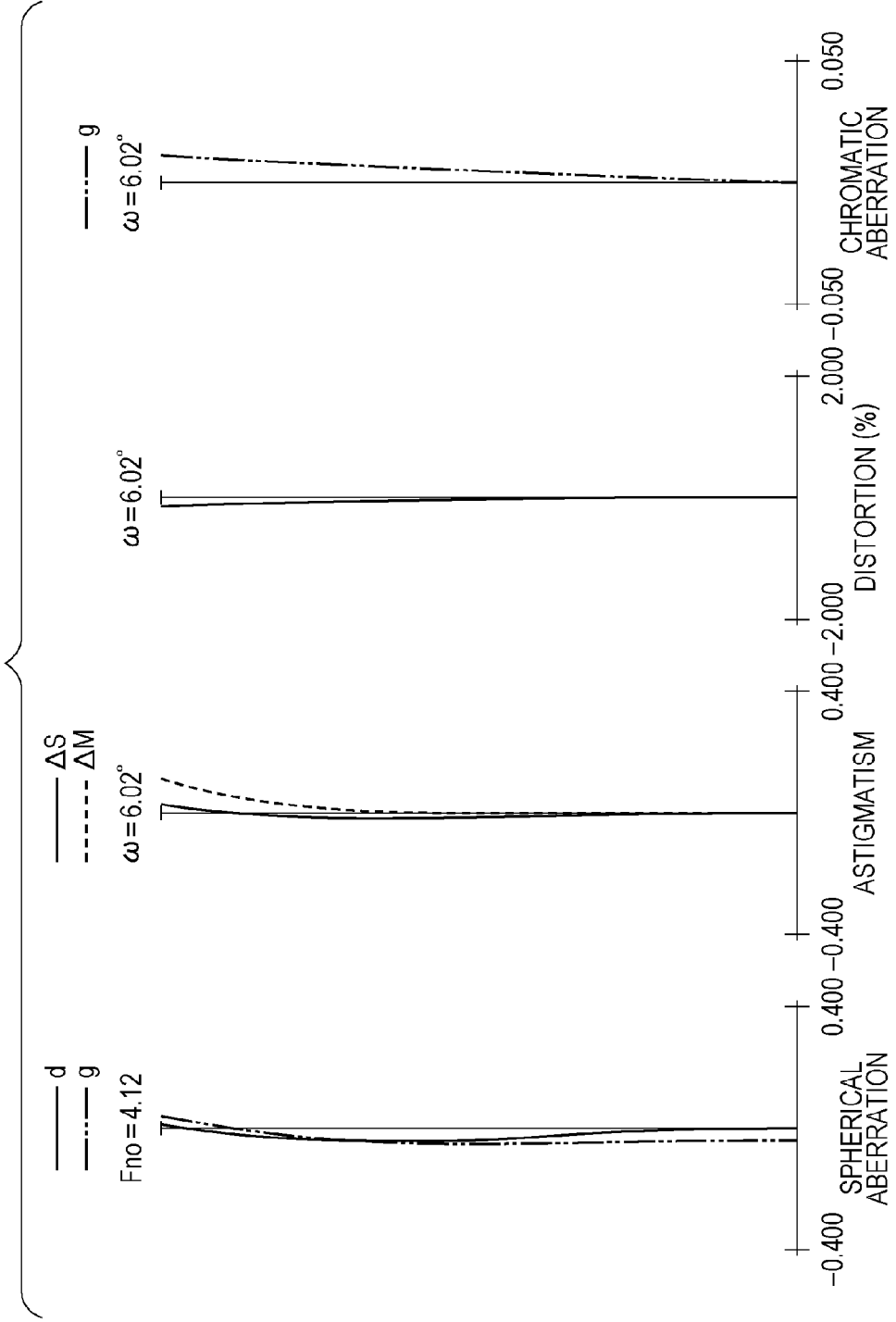

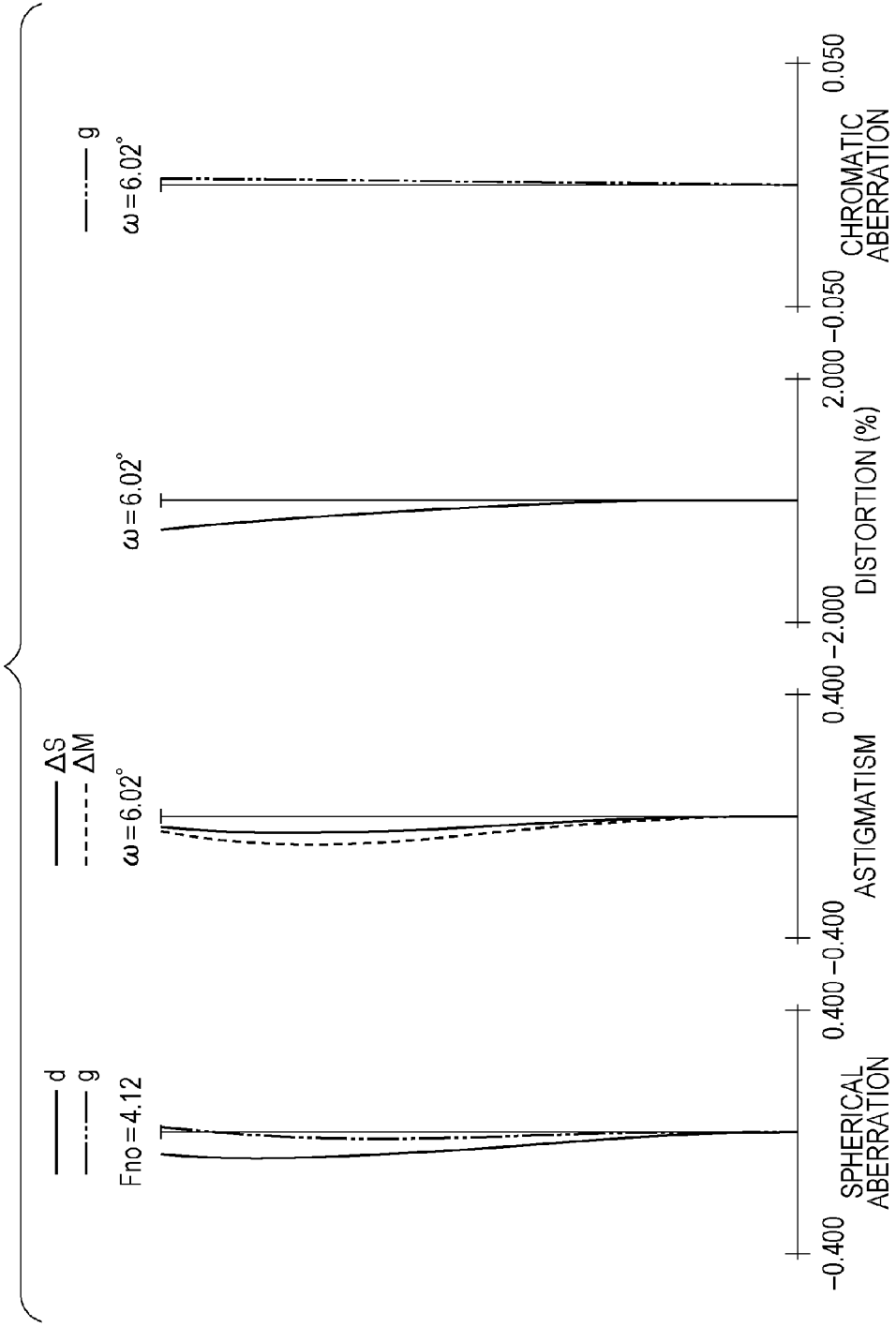

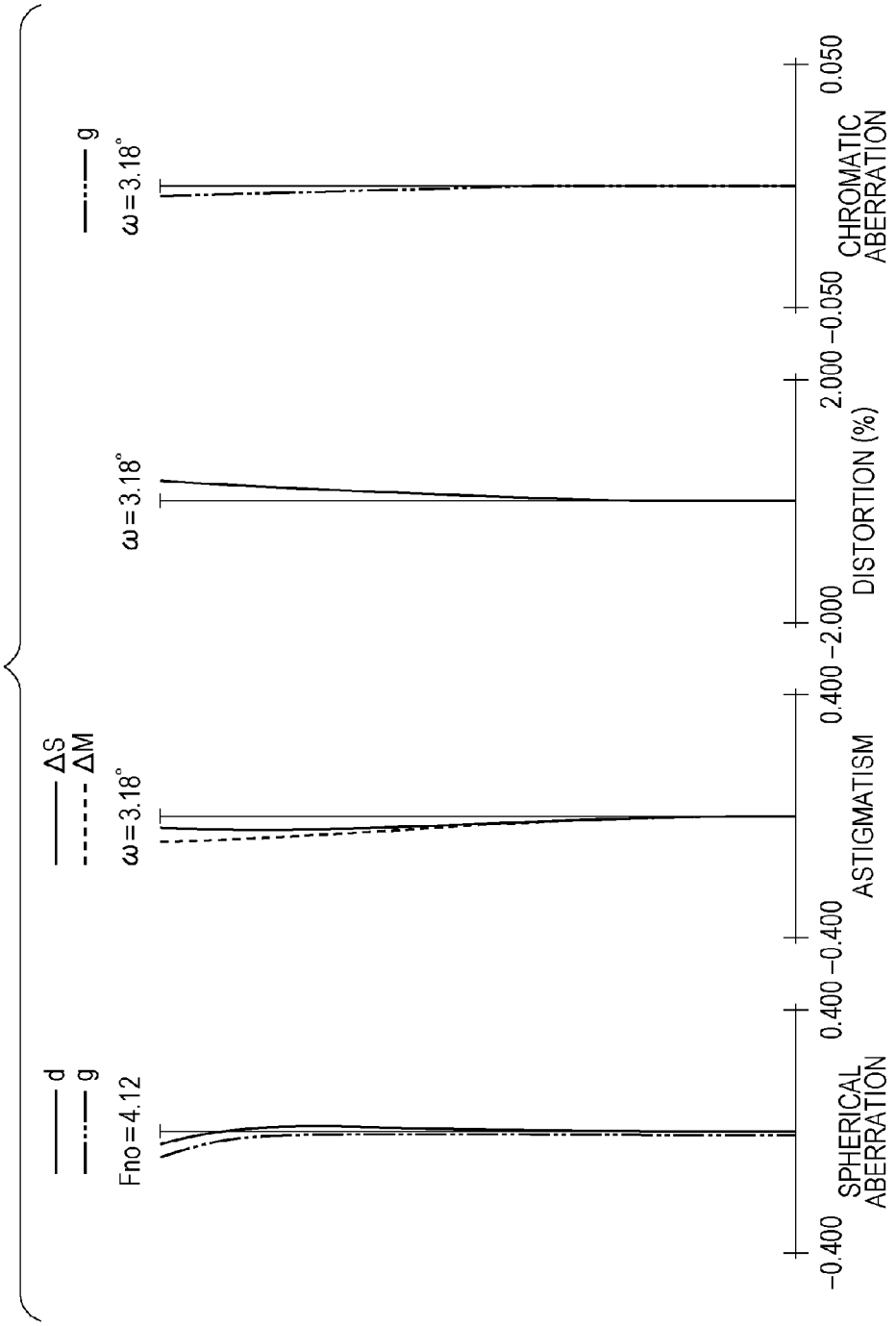

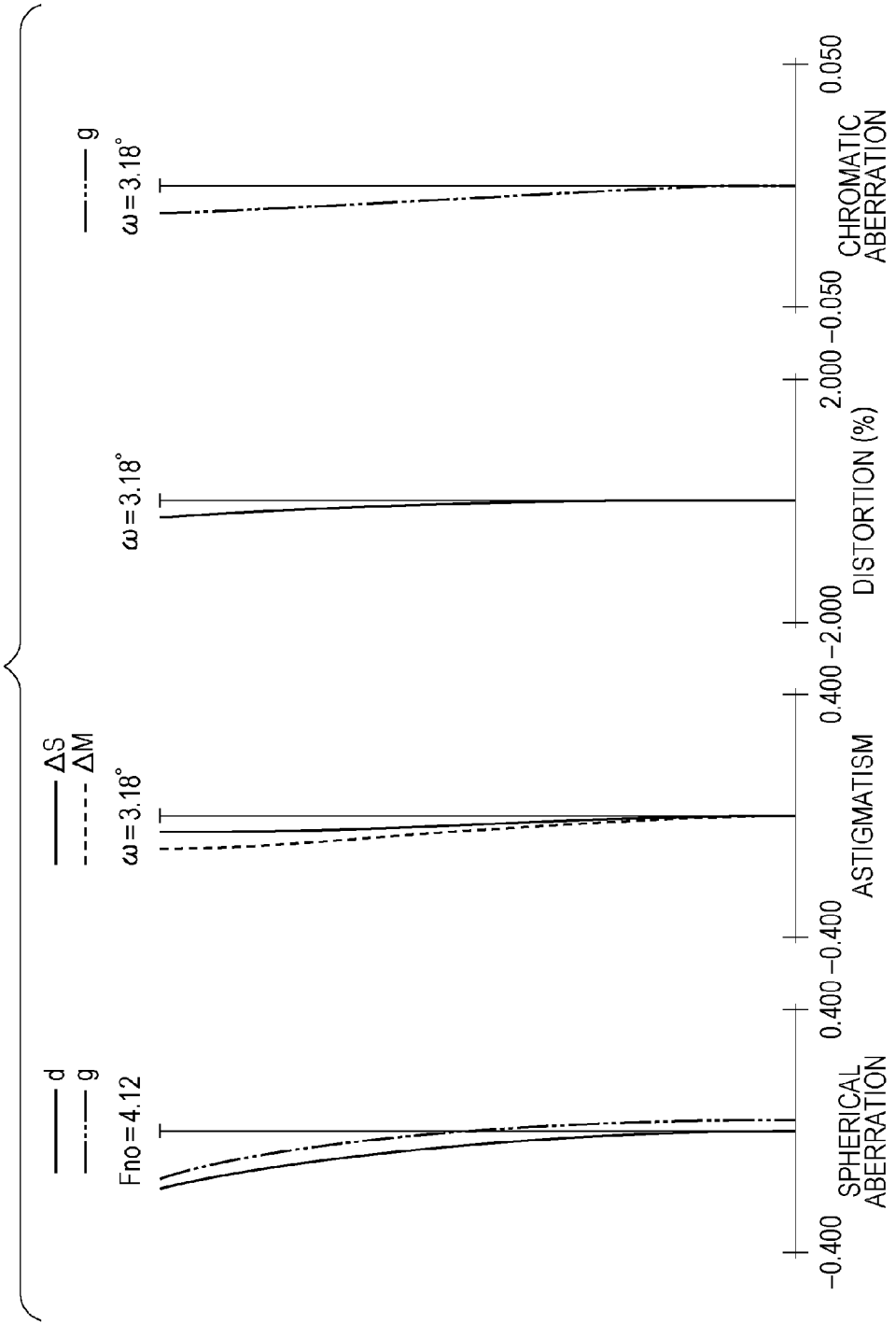

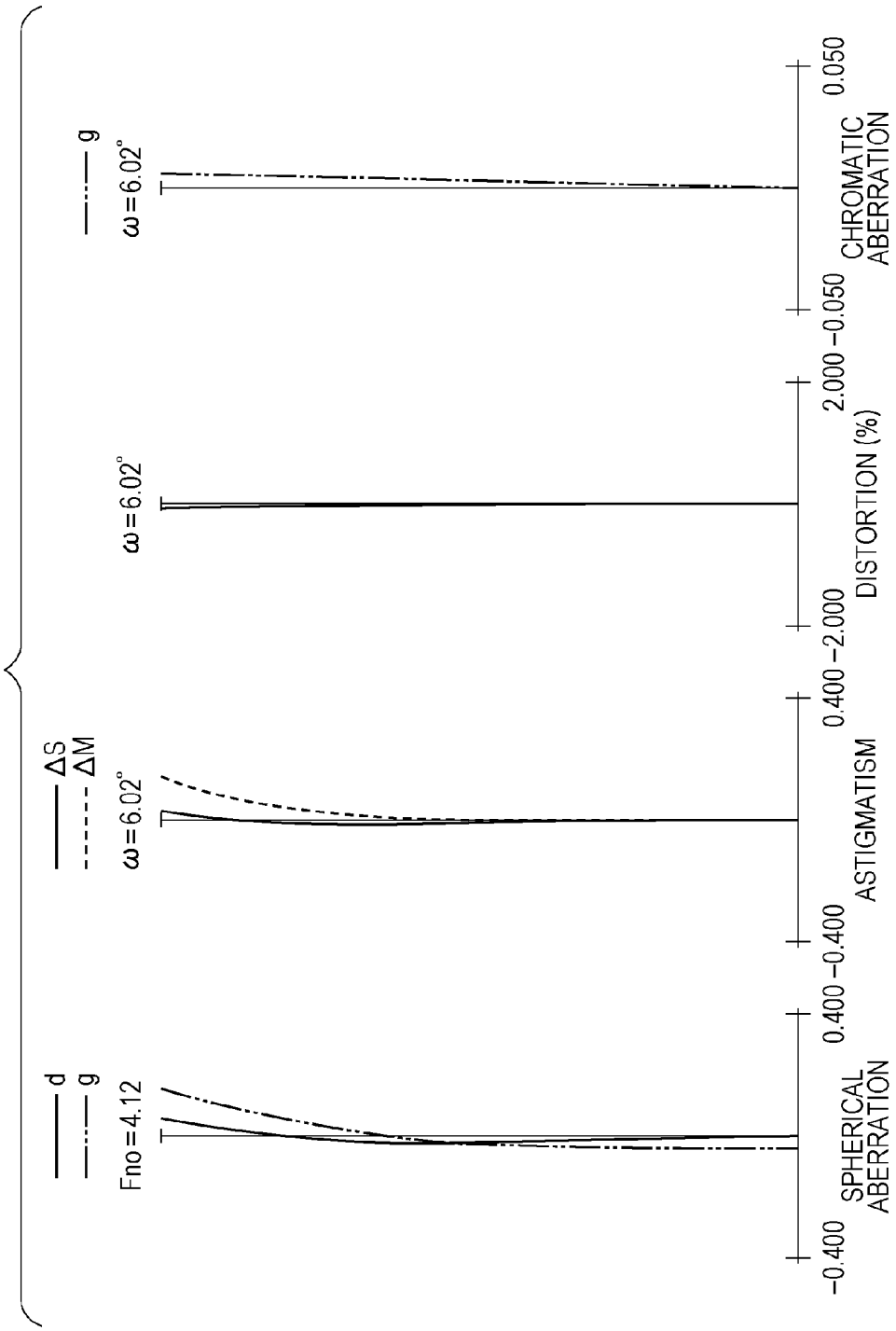

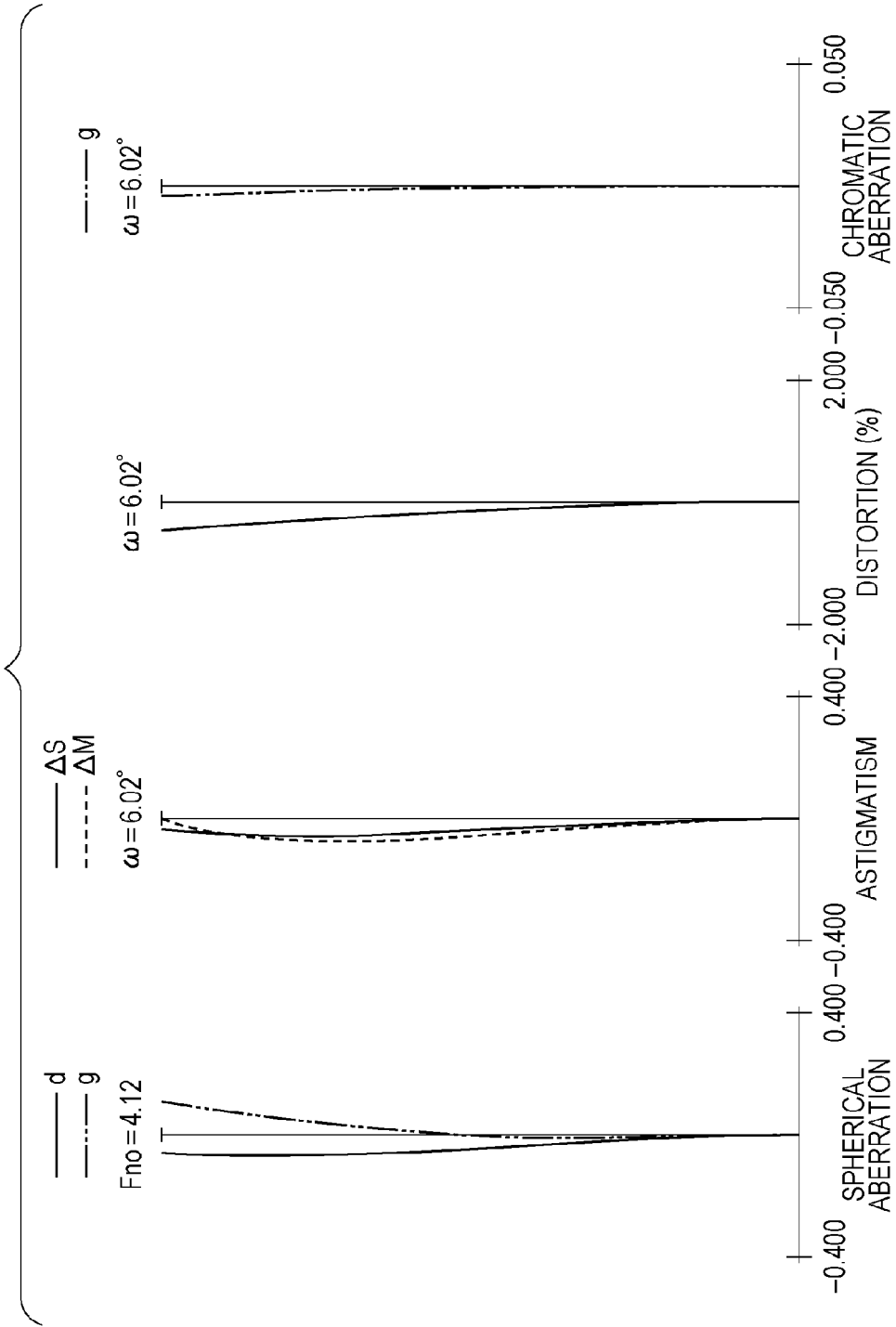

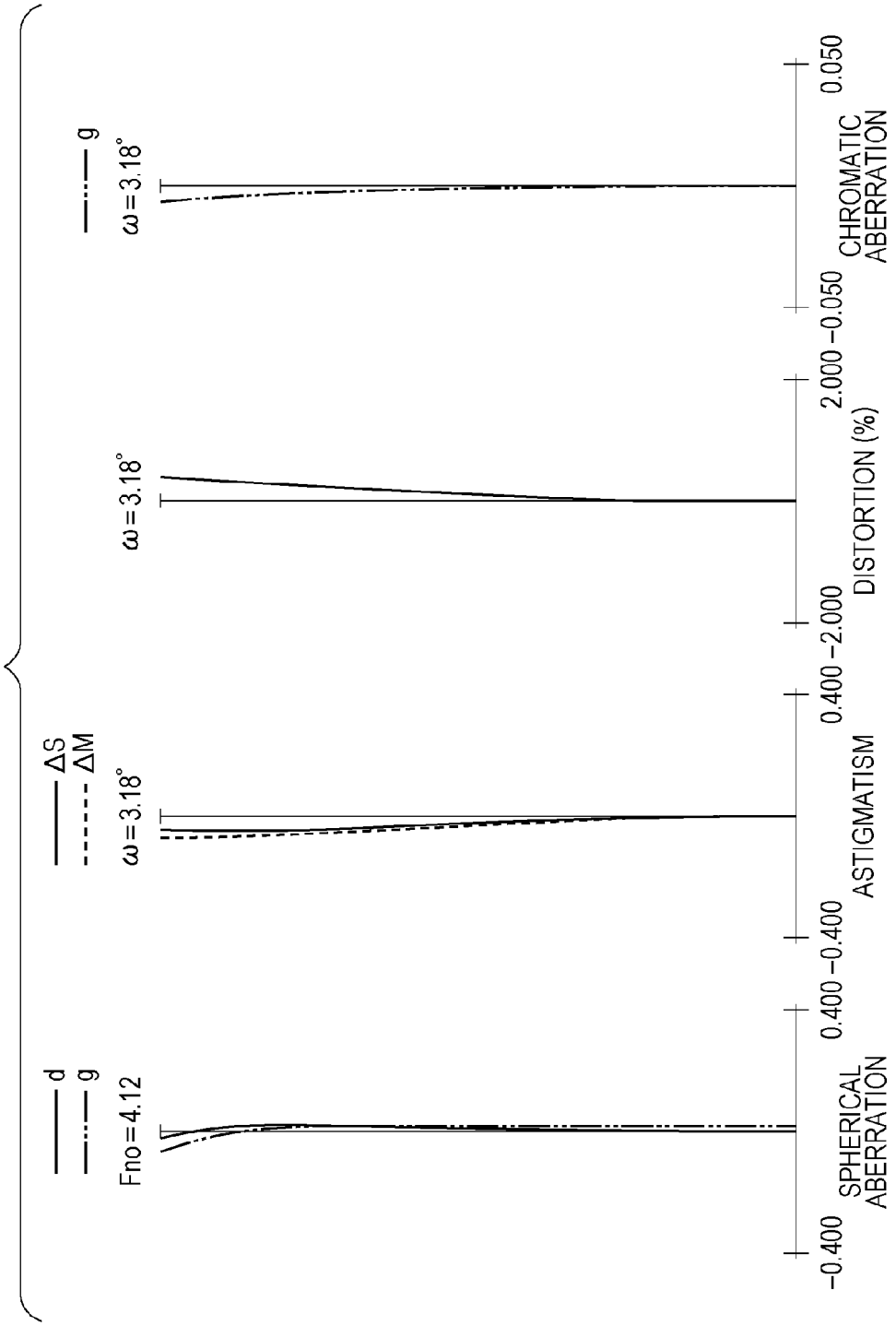

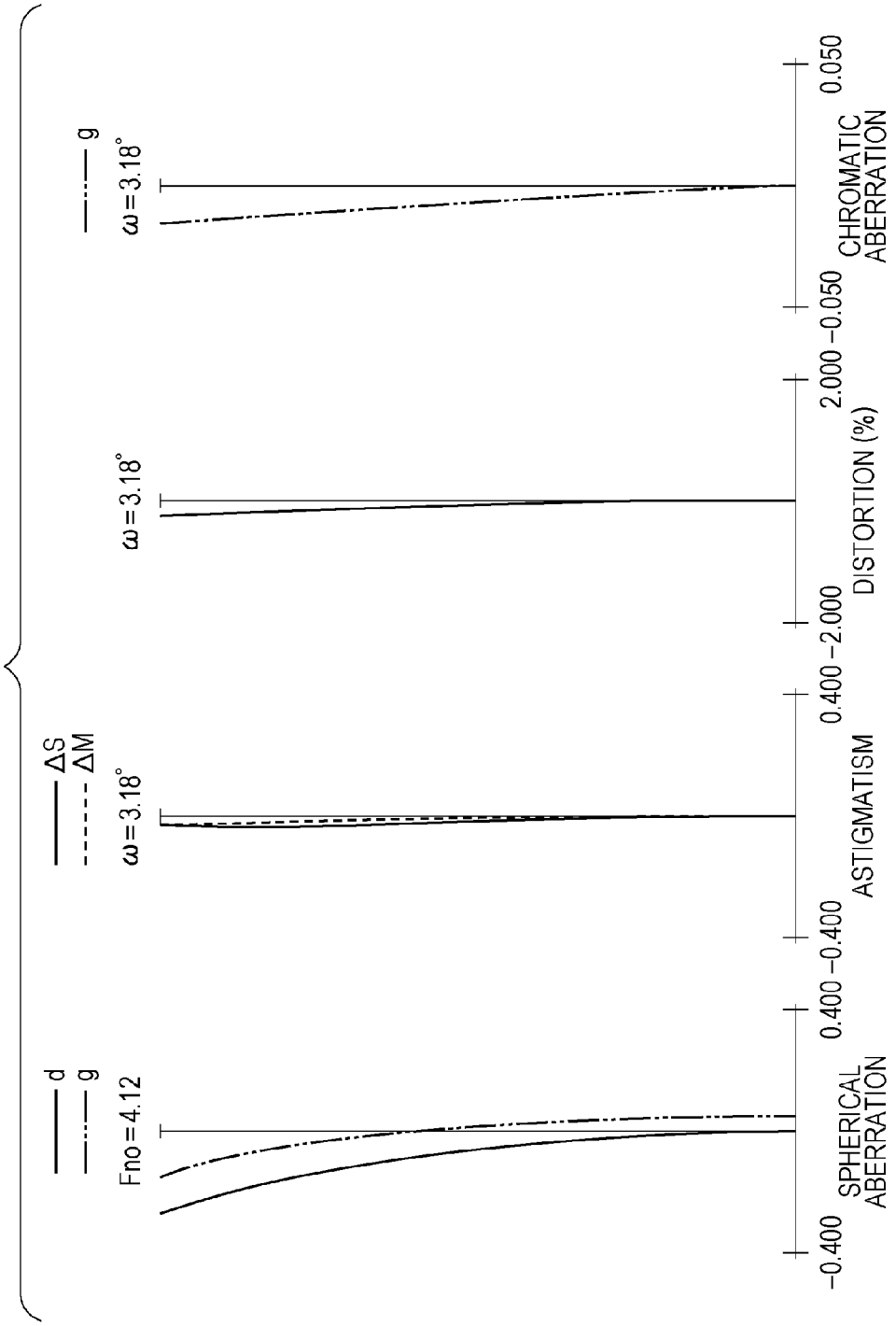

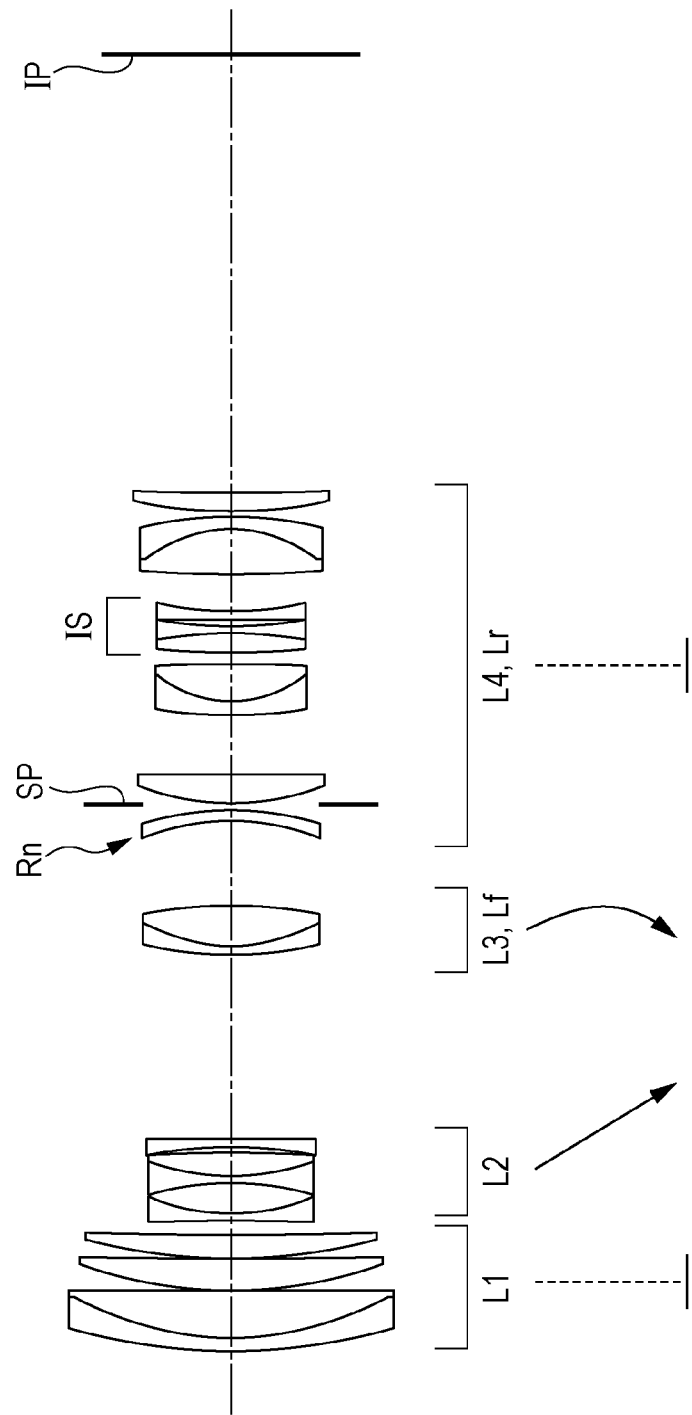

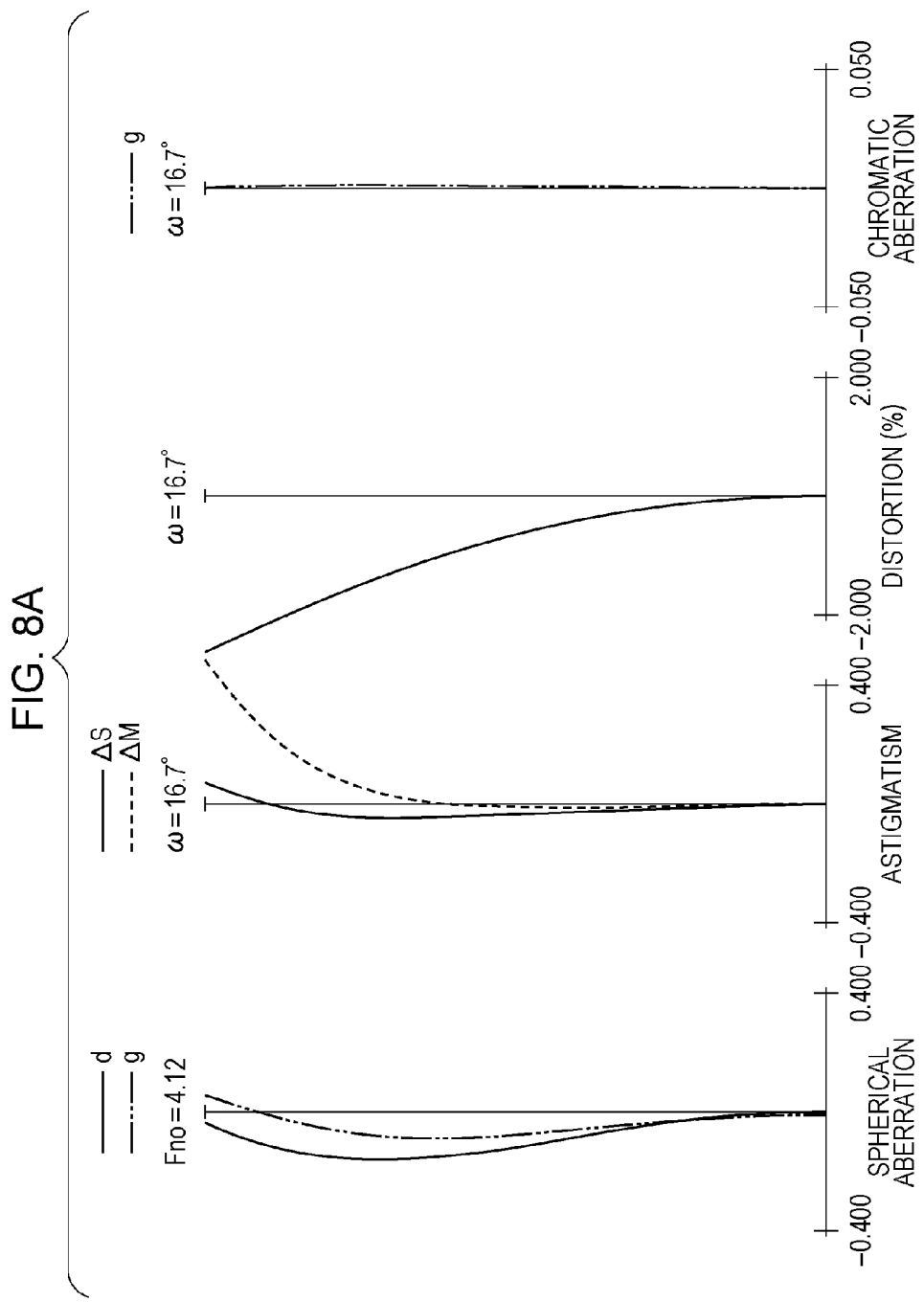

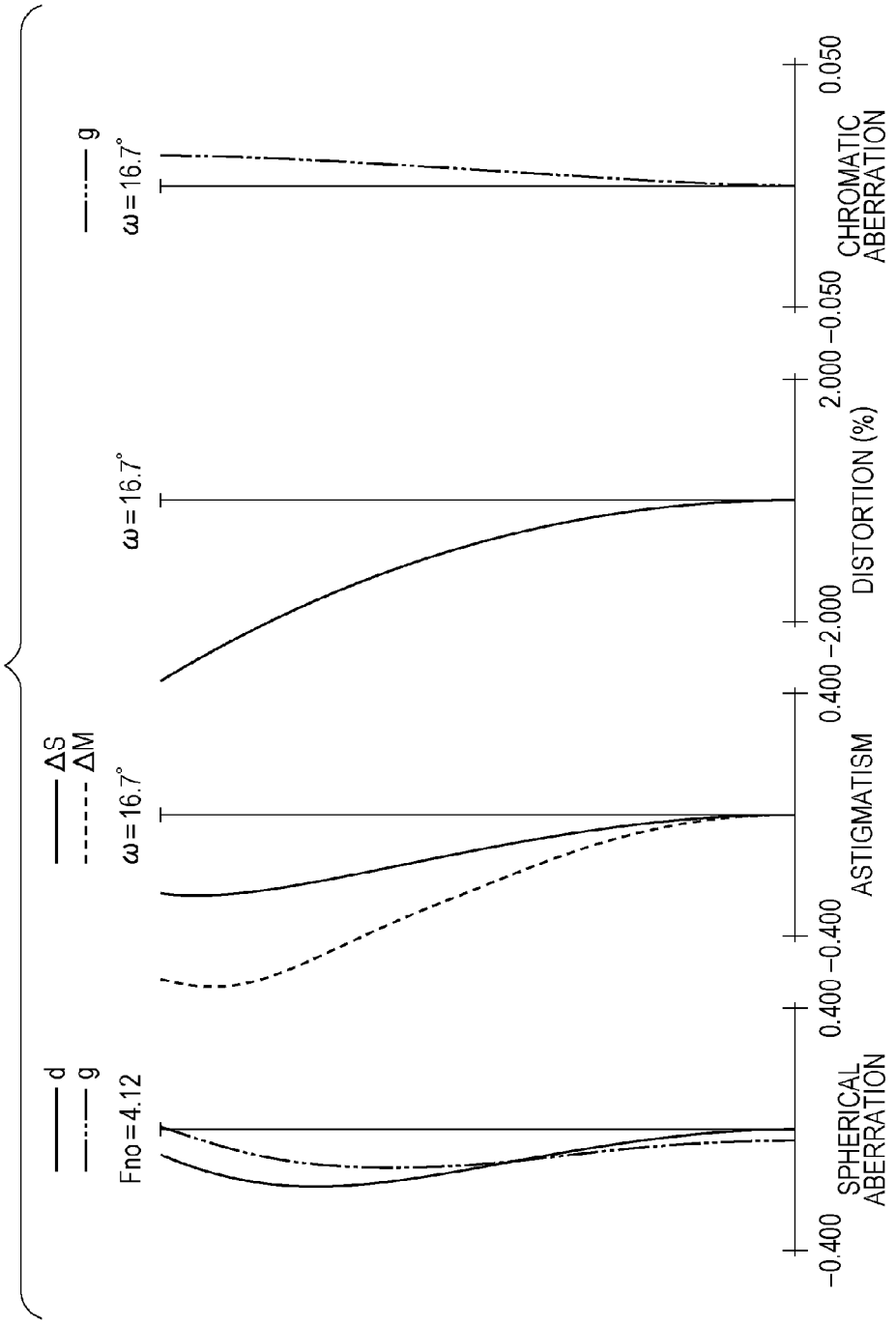

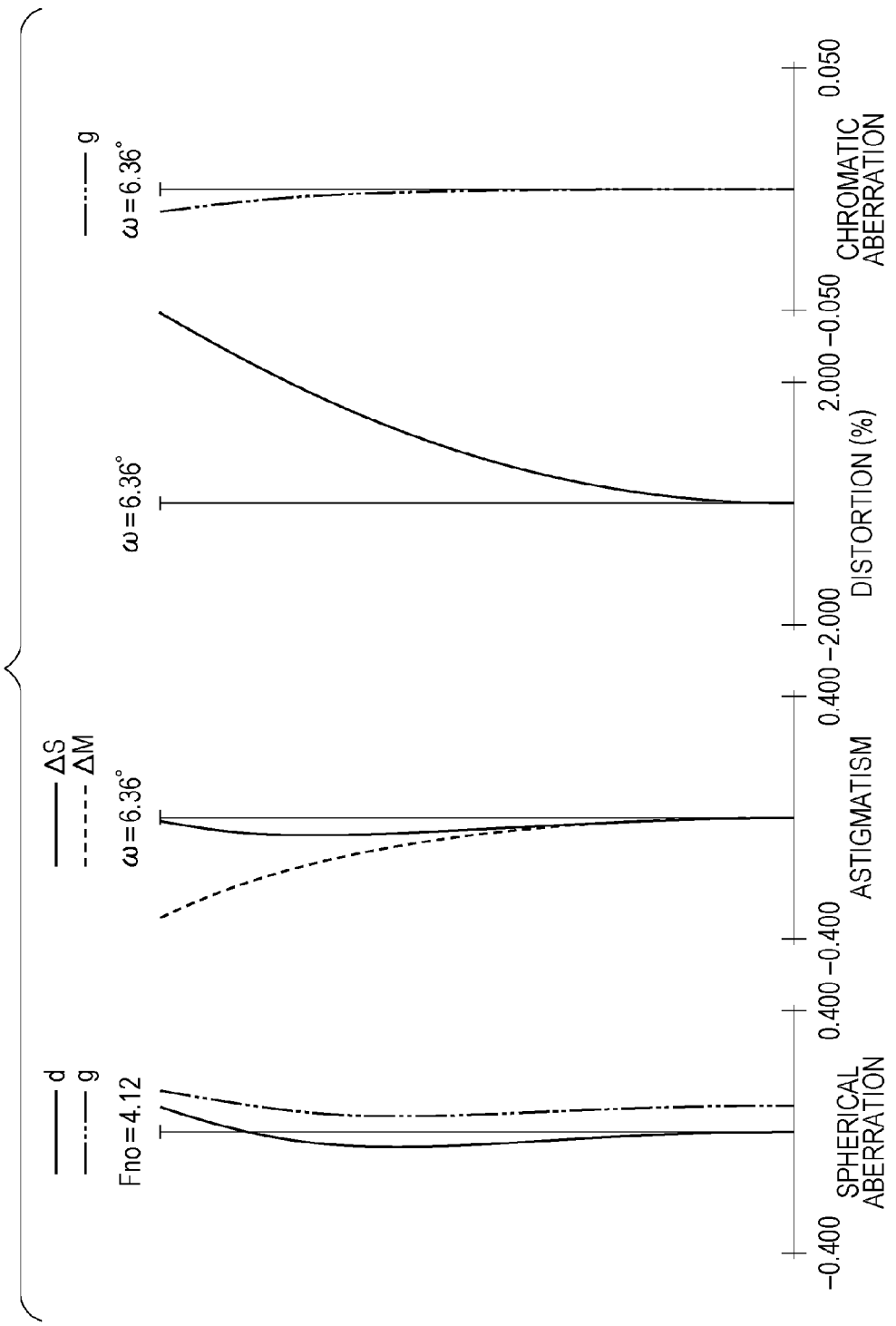

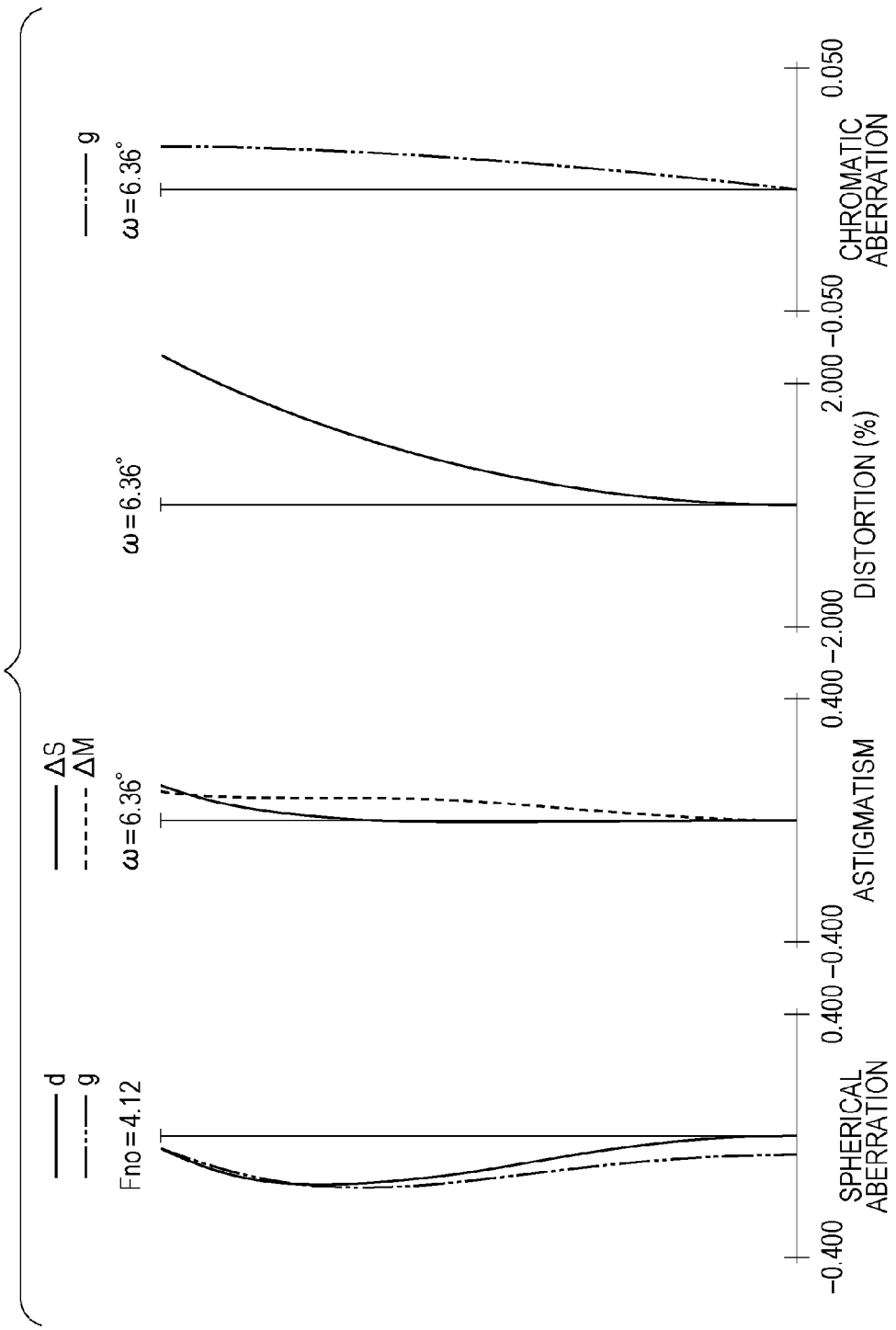

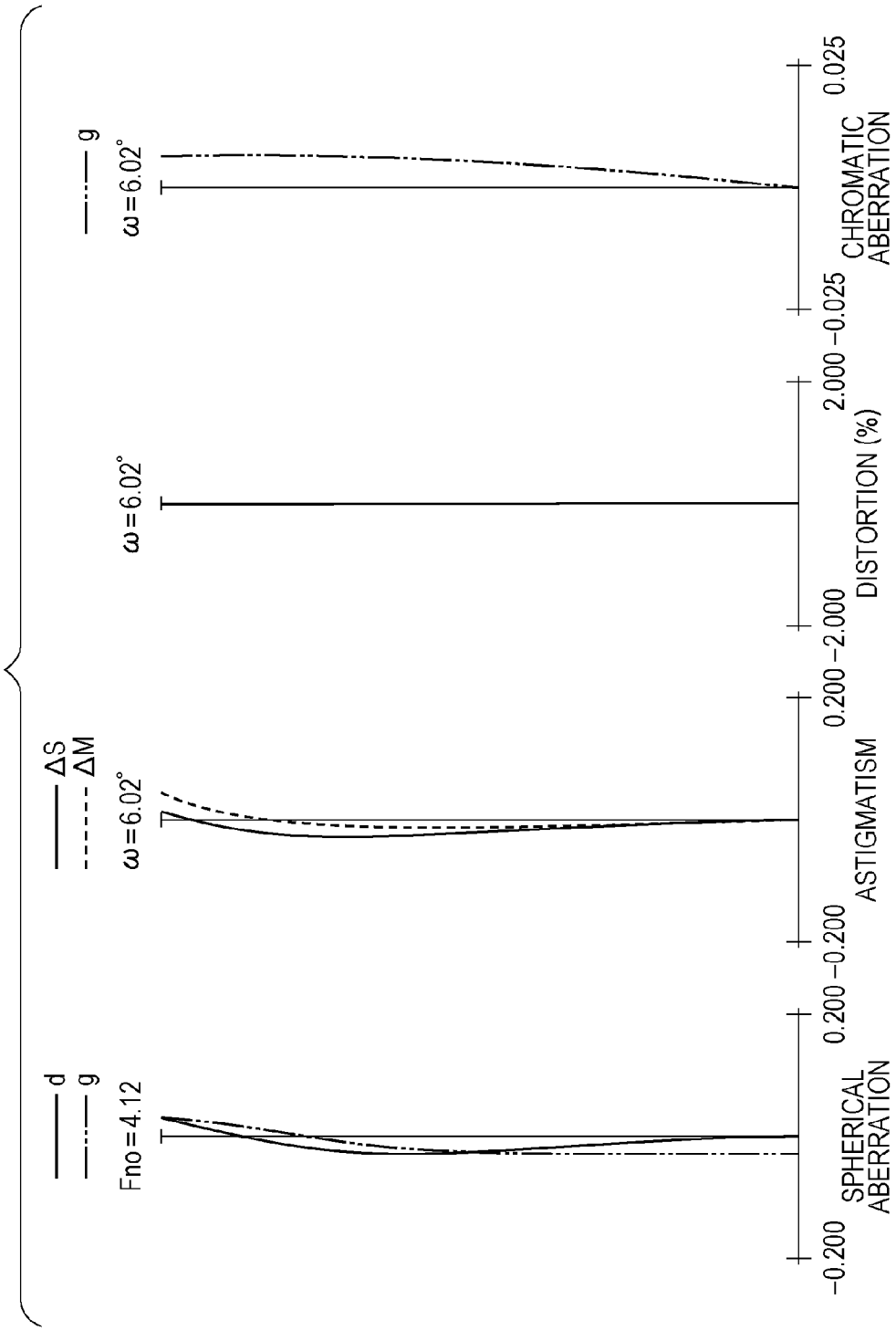

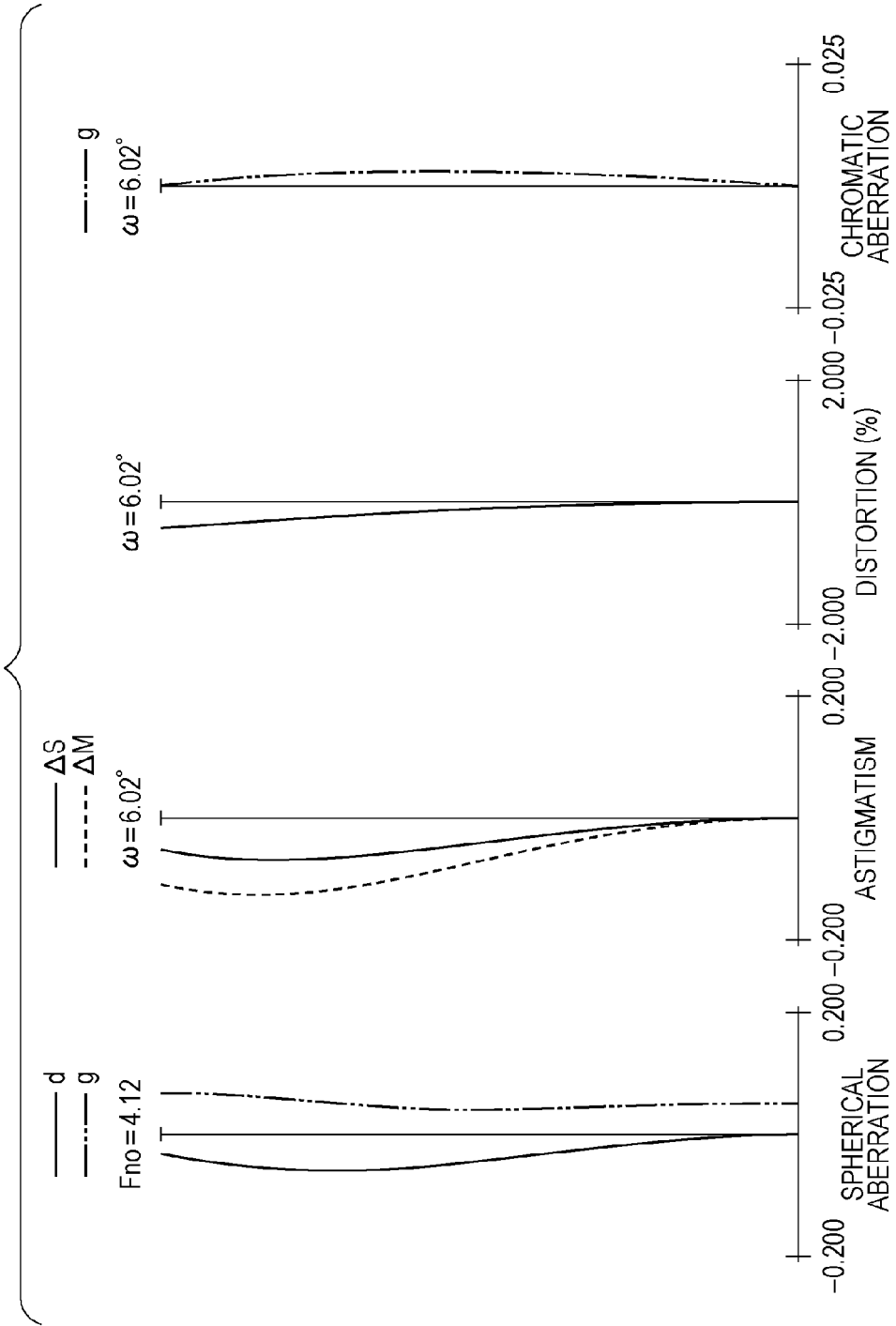

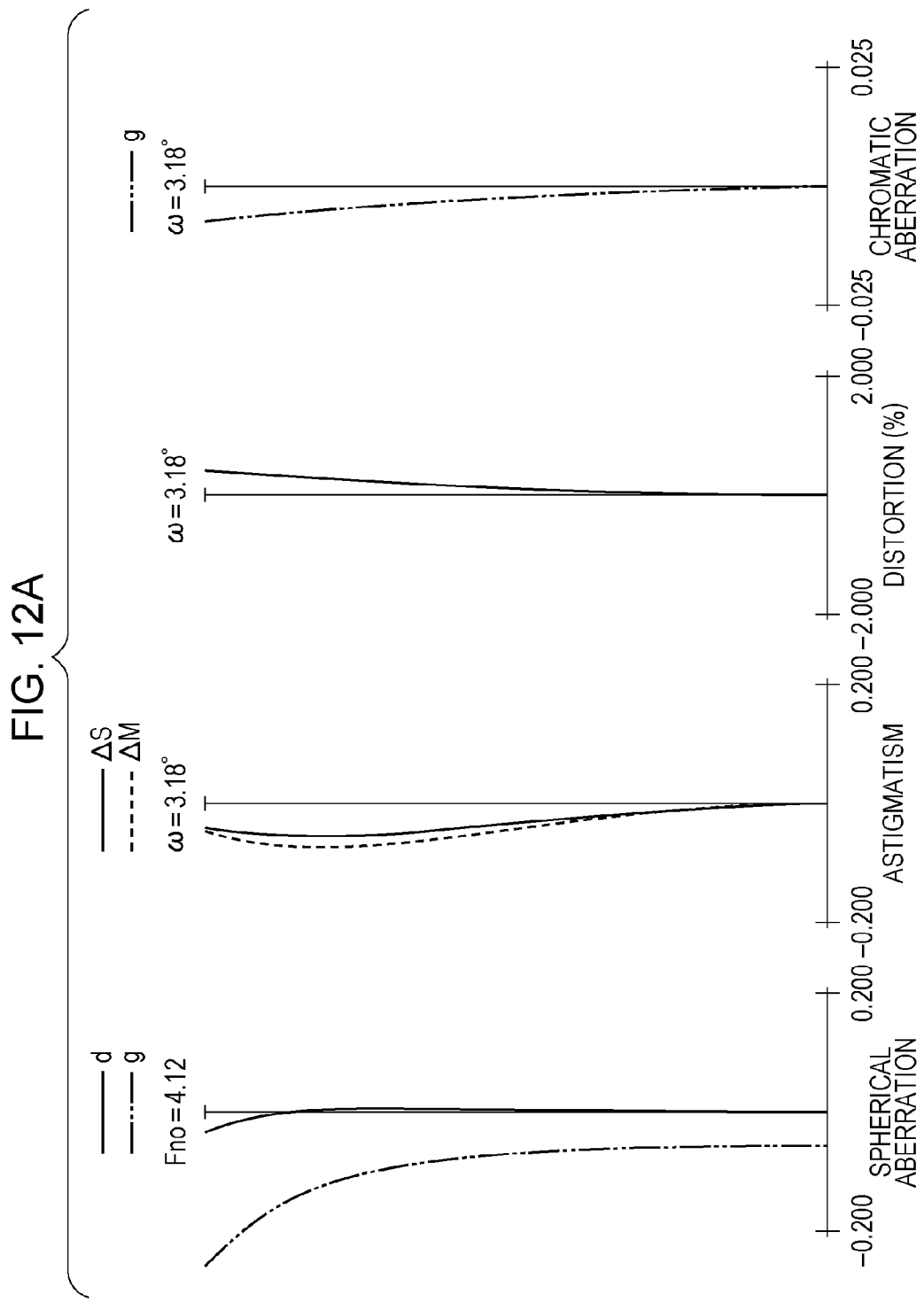

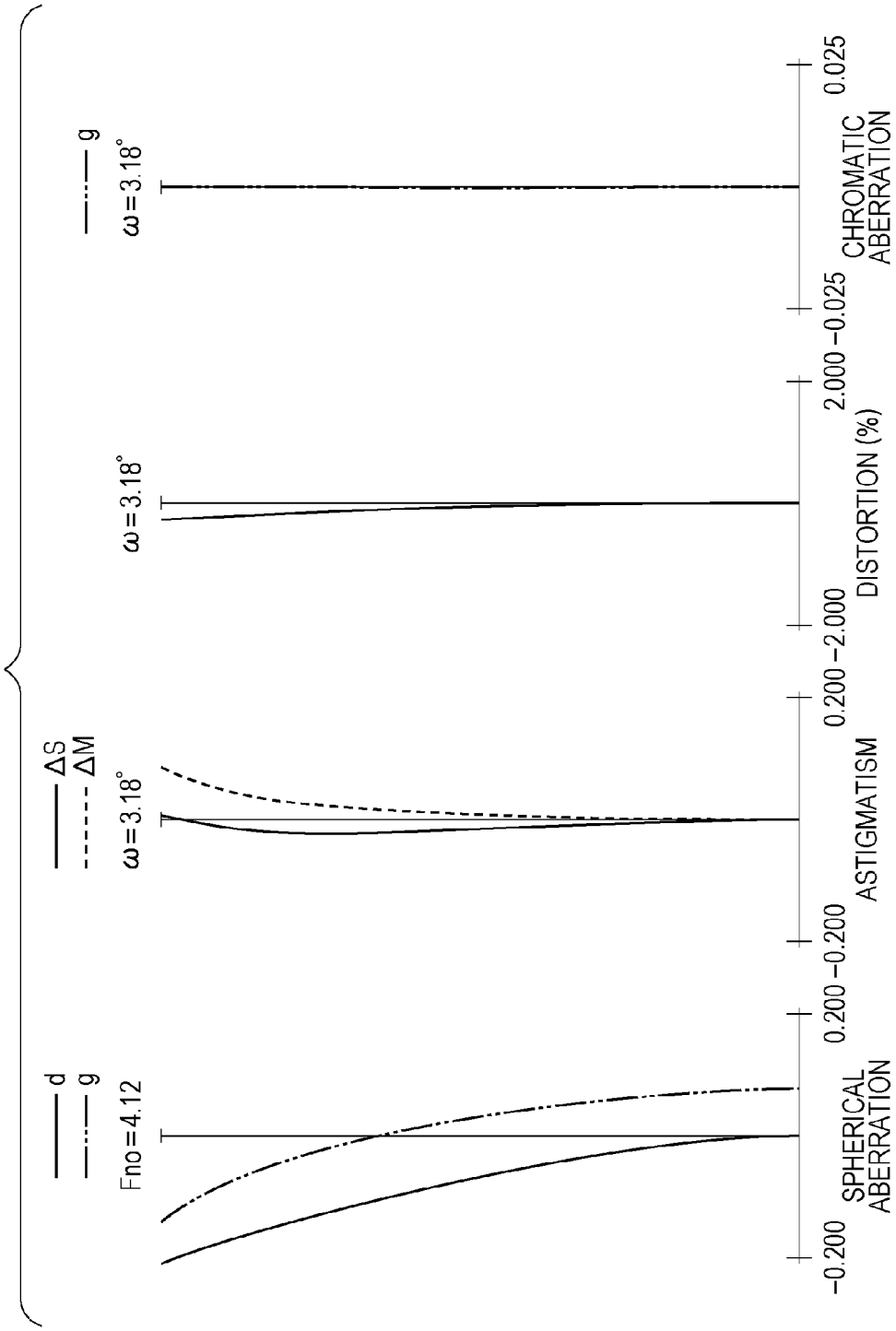

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, and is particularly suitably applicable to a single-lens reflex camera, a video camera, a television camera, a surveillance camera, and the like.

2. Description of the Related Art

Known focusing methods employed in zoom lenses include front-lens focusing in which a first lens unit provided nearest to an object-side end is moved, inner focusing or rear focusing in which a second or subsequent lens unit is moved, and so forth.

In a typical inner-focusing or rear-focusing zoom lens, the first lens unit has a smaller effective aperture than the first lens unit of a front-lens-focusing zoom lens and is therefore advantageous in the size reduction of the lens system as a whole. Furthermore, since focusing is performed by moving a relatively small and light lens unit, quick focusing is realized easily particularly in cameras having an autofocus function.

Known zoom lenses each having a generally small optical system and in which a high zoom ratio is easy to realize include a positive-lead zoom lens in which a lens unit having a positive refractive power is provided nearest to the object-side end.

For example, a known zoom lens includes, in order from an object side to an image side, a first lens unit having a positive refractive power, a second lens unit having a negative refractive power, a third lens unit having a positive refractive power, and a fourth lens unit having a positive refractive power. This zoom lens performs zooming by changing air gaps between adjacent ones of the lens units.

Japanese Patent Laid-Open No. 59-52215 discloses a zoom lens that performs zooming by moving a second lens unit and a third lens unit and performs focusing by moving the third lens unit. Japanese Patent Laid-Open No. 2009-086537 discloses a zoom lens that performs zooming by moving a second lens unit and a third lens unit, performs focusing by moving the third lens unit, and performs image stabilization by moving a sub-lens unit included in a fourth lens unit in a direction perpendicular to the optical axis.

In an inner-focusing zoom lens, variations in aberrations during focusing are larger than in a front-lens-focusing zoom lens. Particularly, in focusing on a near object, various aberrations such as spherical aberration tend to become large.

In an inner-focusing positive-lead zoom lens, it is important to reduce variations in aberrations during focusing and to provide good optical performance for all objects that are at any distances while realizing a high zoom ratio and a size reduction of the lens system as a whole. To achieve this, it is important to appropriately set the refractive powers and the lens configurations of the lens units and the conditions under which the lens units are moved during zooming.

Particularly, it is important to appropriately set the lens configurations and so forth of a lens unit that is used for focusing and lens units that are provided on the image side of the lens unit used for focusing. Unless the configurations of these lens units are set appropriately, it is very difficult to provide a zoom lens having high optical performance at all zooming positions and at all object distances while realizing a high zoom ratio.

SUMMARY OF THE INVENTION

An embodiment of the present invention provides a zoom lens that has a high zoom ratio with a small size and easily provides high optical performance at all zooming positions and at all object distances. An embodiment of the present invention also provides an image pickup apparatus including the zoom lens.

A zoom lens according to an aspect of the present invention includes an imaging lens unit having a positive refractive power and provided nearest to an image-side end, and a focusing lens unit having a positive refractive power and provided on an object side of the imaging lens unit. A distance between the imaging lens unit and the focusing lens unit changes during zooming. The focusing lens unit moves during focusing. The imaging lens unit includes, at a position thereof nearest to an object-side end, a negative meniscus lens component that is concave on the object side thereof.

Further features of the present invention will become apparent from the following description of exemplary embodiments with reference to the attached drawings.

BRIEF DESCRIPTION OF THE DRAWINGS

FIG. 1 is a sectional view of a zoom lens according to a first embodiment of the present invention that is at a wide-angle end (short-focal-length end) and is focused on an object at infinity.

FIGS. 2A and 2B are diagrams illustrating longitudinal aberration curves in the zoom lens according to the first embodiment of the present invention that is at the wide-angle end and is focused on the object at infinity and on a near object (at 2.0 m), respectively.

FIGS. 3A and 3B are diagrams illustrating longitudinal aberration curves in the zoom lens according to the first embodiment of the present invention that is at a telephoto end (long-focal-length end) and is focused on the object at infinity and on the near object (at 2.0 m), respectively.

FIGS. 5A and 5B are diagrams illustrating longitudinal aberration curves in the zoom lens according to the second embodiment of the present invention that is at the wide-angle end and is focused on the object at infinity and on a near object (at 2.0 m), respectively.

FIGS. 6A and 6B are diagrams illustrating longitudinal aberration curves in the zoom lens according to the second embodiment of the present invention that is at a telephoto end and is focused on the object at infinity and on the near object (at 2.0 m), respectively.

FIG. 7 is a sectional view of a zoom lens according to a third embodiment of the present invention that is at a wide-angle end and is focused on an object at infinity.

FIGS. 8A and 8B are diagrams illustrating longitudinal aberration curves in the zoom lens according to the third embodiment of the present invention that is at the wide-angle end and is focused on the object at infinity and on a near object (at 2.0 m), respectively.

FIGS. 9A and 9B are diagrams illustrating longitudinal aberration curves in the zoom lens according to the third embodiment of the present invention that is at a telephoto end and is focused on the object at infinity and on the near object (at 2.0 m), respectively.

FIGS. 11A and 11B are diagrams illustrating longitudinal aberration curves in the zoom lens according to the fourth embodiment of the present invention that is at the wide-angle end and is focused on the object at infinity and on a near object (at 2.0 m), respectively.

FIGS. 12A and 12B are diagrams illustrating longitudinal aberration curves in the zoom lens according to the fourth embodiment of the present invention that is at a telephoto end and is focused on the object at infinity and on the near object (at 2.0 m), respectively.

DESCRIPTION OF THE EMBODIMENTS

Embodiments of the present invention will now be described in detail with reference to the attached drawings. A zoom lens according to an embodiment of the present invention includes an imaging lens unit Lr having a positive refractive power and provided nearest to an image-side end, and a focusing lens unit Lf having a positive refractive power and provided on an object side of the imaging lens unit Lr. During zooming, the distance between the imaging lens unit Lr and the focusing lens unit Lf changes. During focusing, the focusing lens unit Lf moves. The imaging lens unit Lr includes a negative meniscus lens component provided nearest to an object-side end and being concave on the object side thereof. Herein, the term "lens component" encompasses a single lens component and a cemented lens in which a plurality of lens components are bonded together.

The zoom lens according to the embodiment of the present invention may include, on the object side of the focusing lens unit Lf and in order from the object side to the image side, a first lens unit having a positive refractive power and a second lens unit having a negative refractive power. During zooming from a wide-angle end to a telephoto end, the second lens unit moves toward the image side while the focusing lens unit Lf moves along a locus that is convex toward the image side.

Alternatively, the zoom lens according to the embodiment of the present invention may include, on the object side of the focusing lens unit Lf and in order from the object side to the image side, a first lens unit having a positive refractive power, a second lens unit having a negative refractive power, and a third lens unit having a negative refractive power. During zooming from the wide-angle end to the telephoto end, the second lens unit and the third lens unit move toward the image side along respectively different loci while the focusing lens unit Lf moves along a locus that is convex toward the image side.

FIG. 1 is a sectional view of a zoom lens according to a first embodiment of the present invention that is at a wide-angle end (short-focal-length end) and is focused on an object at infinity. FIGS. 2A and 2B are diagrams illustrating longitudinal aberration curves in the zoom lens according to the first embodiment of the present invention that is at the wide-angle end and is focused on the object at infinity and on a near object (at 2.0 m), respectively. FIGS. 3A and 3B are diagrams illustrating longitudinal aberration curves in the zoom lens according to the first embodiment of the present invention that is at a telephoto end (long-focal-length end) and is focused on the object at infinity and on the near object (at 2.0 m), respectively.

Figure 4:
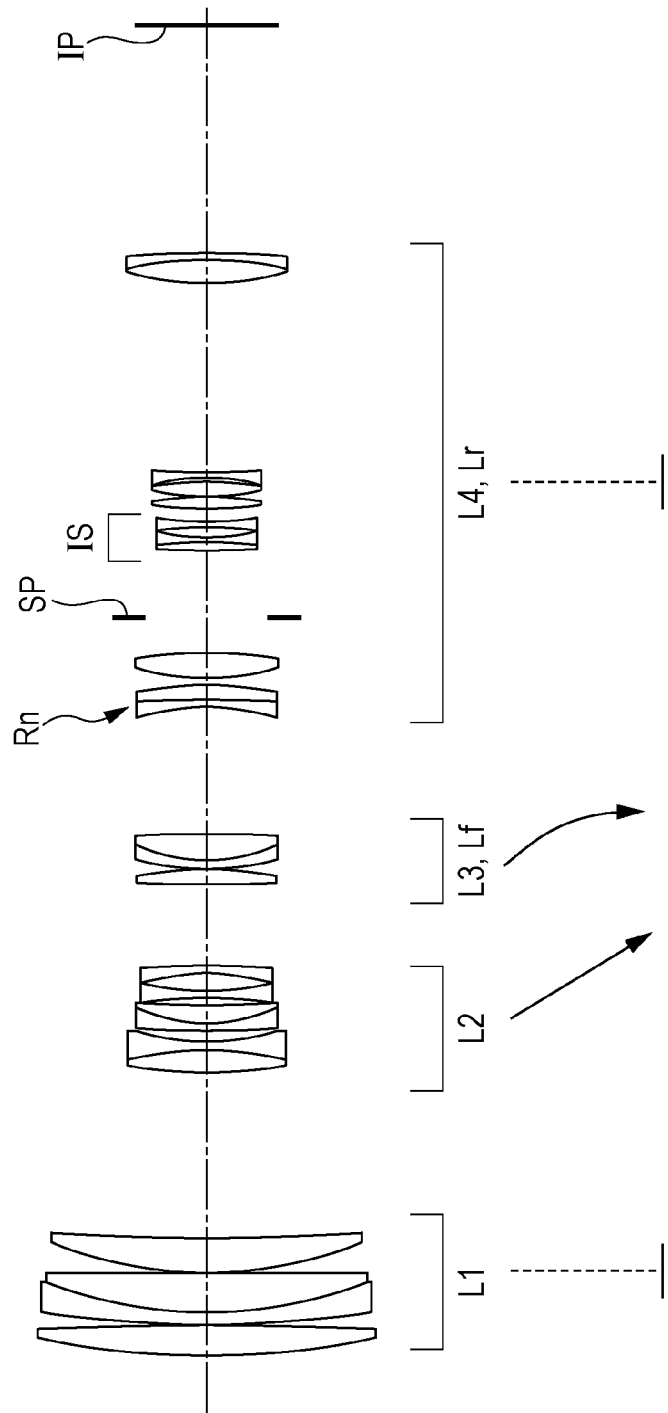
FIG. 4 is a sectional view of a zoom lens according to a second embodiment of the present invention that is at a wide-angle end and is focused on an object at infinity.

FIG. 4 is a sectional view of a zoom lens according to a second embodiment of the present invention that is at a wide-angle end and is focused on an object at infinity. FIGS. 5A and 5B are diagrams illustrating longitudinal aberration curves in the zoom lens according to the second embodiment of the present invention that is at the wide-angle end and is focused on the object at infinity and on a near object (at 2.0 m), respectively. FIGS. 6A and 6B are diagrams illustrating longitudinal aberration curves in the zoom lens according to the second embodiment of the present invention that is at a telephoto end and is focused on the object at infinity and on the near object (at 2.0 m), respectively.

FIG. 7 is a sectional view of a zoom lens according to a third embodiment of the present invention that is at a wide-angle end is focused on an object at infinity. FIGS. 8A and 8B are diagrams illustrating longitudinal aberration curves in the zoom lens according to the third embodiment of the present invention that is at the wide-angle end and is focused on the object at infinity and on a near object (at 2.0 m), respectively. FIGS. 9A and 9B are diagrams illustrating longitudinal aberration curves in the zoom lens according to the third embodiment of the present invention that is at a telephoto end and is focused on the object at infinity and on the near object (at 2.0 m), respectively.

Figure 10:
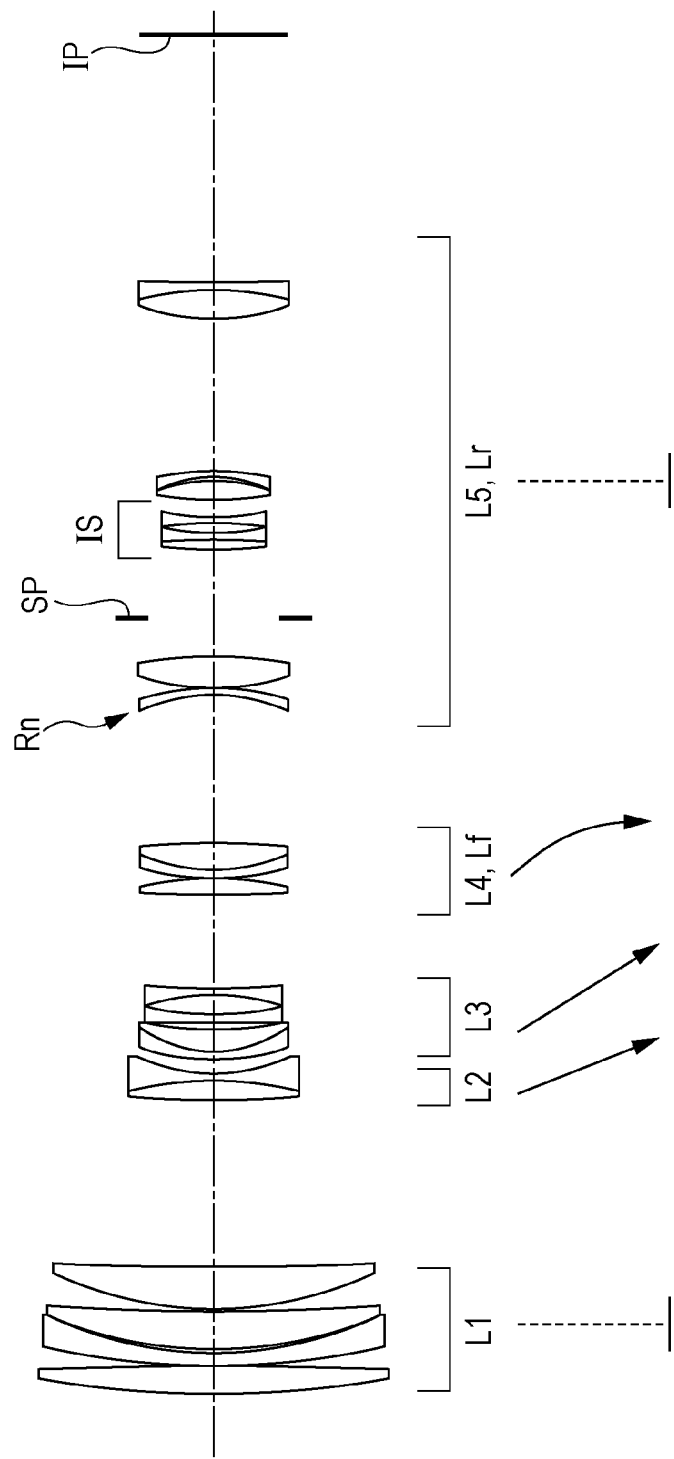
FIG. 10 is a sectional view of a zoom lens according to a fourth embodiment of the present invention that is at a wide-angle end and is focused on an object at infinity.

FIG. 10 is a sectional view of a zoom lens according to a fourth embodiment of the present invention that is at a wide-angle end and is focused on an object at infinity. FIGS. 11A and 11B are diagrams illustrating longitudinal aberration curves in the zoom lens according to the fourth embodiment of the present invention that is at the wide-angle end and is focused on the object at infinity and on a near object (at 2.0 m), respectively. FIGS. 12A and 12B are diagrams illustrating longitudinal aberration curves in the zoom lens according to the fourth embodiment of the present invention that is at a telephoto end and is focused on the object at infinity and on the near object (at 2.0 m), respectively.

Figure 13:
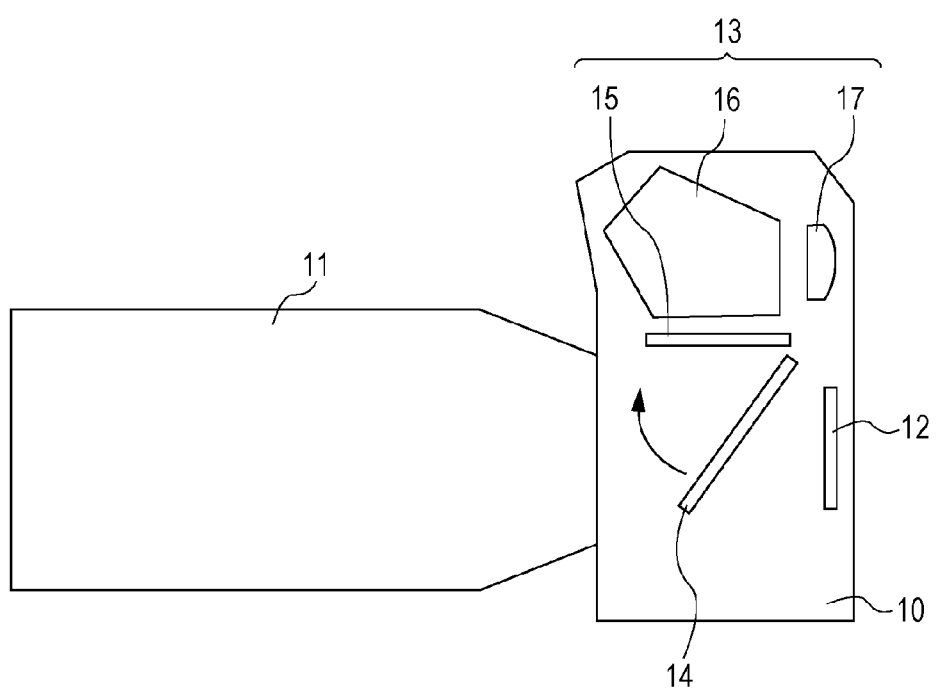
FIG. 13 is a schematic diagram of an image pickup apparatus according to an embodiment of the present invention.

FIG. 13 is a schematic diagram of a camera (image pickup apparatus) including the zoom lens according to any of the embodiments of the present invention. The zoom lenses according to the embodiments are each an imaging lens system that is applicable to image pickup apparatuses such as a video camera, a digital camera, and a silver-halide-film camera. In the sectional views of the zoom lenses, the left side corresponds to the object side (front side), and the right side corresponds to the image side (rear side). In the sectional views of the zoom lenses, Li denotes an i-th lens unit, where i denotes the order of the lens unit counted from the object side.

The zoom lenses illustrated in FIGS. 1, 4, and 7 each include a first lens unit L1 having a positive refractive power, a second lens unit L2 having a negative refractive power, a third lens unit L3 (focusing lens unit Lf) having a positive refractive power, and a fourth lens unit L4 (imaging lens unit Lr) having a positive refractive power. The fourth lens unit L4 corresponds to the imaging lens unit Lr provided nearest to the image-side end. The third lens unit L3 is provided on the object side of the imaging lens unit Lr and corresponds to the focusing lens unit Lf that moves during focusing.

The zoom lens illustrated in FIG. 10 includes a first lens unit L1 having a positive refractive power, a second lens unit L2 having a negative refractive power, a third lens unit L3 having a negative refractive power, a fourth lens unit L4 (focusing lens unit Lf) having a positive refractive power, and a fifth lens unit L5 (imaging lens unit Lr) having a positive refractive power. The fifth lens unit L5 corresponds to the imaging lens unit Lr provided nearest to the image-side end. The fourth lens unit L4 is provided on the object side of the imaging lens unit Lr and corresponds to the focusing lens unit Lf that moves during focusing.

Herein, the term "refractive power" refers to optical power and is the reciprocal of focal length. Each of the above imaging lens units Lr includes a sub-lens unit IS. The sub-lens unit IS moves in a direction containing a component that is perpendicular to the optical axis, thereby moving the projected image in the direction perpendicular to the optical axis. The sub-lens unit IS is an image-stabilizing lens unit that corrects image blurring that may occur when the zoom lens as a whole is shaken.

The above zoom lenses each include an aperture stop SP. An image plane IP is a photosensitive surface that corresponds to an image pickup surface of a solid-state image pickup device (photoelectric conversion device) such as a charge-coupled-device (CCD) sensor or a complementary-metal-oxide-semiconductor (CMOS) sensor when the zoom lens is used as an imaging optical system of a video camera or a digital still camera, or to a film surface when the zoom lens is used for a silver-halide-film camera.

In the diagrams illustrating aberration curves, d and g denote d-line and g-line, respectively, and ΔM and ΔS denote the meridional image plane and the sagittal image plane, respectively. Lateral chromatic aberration is for g-line. Furthermore, ω denotes the half angle of view, and Fno denotes the f-number. In each of the following embodiments, the wide-angle end and the telephoto end refer to zooming positions at extreme ends, respectively, of a range in which the lens units are mechanically movable along the optical axis.

Arrows illustrated in each of the sectional views represent the loci along which the respective lens units move during zooming from the wide-angle end to the telephoto end. In each of the first, second and third embodiments illustrated in FIGS. 1, 4, and 7, during zooming from the wide-angle end to the telephoto end, the lens units move as represented by the respective arrows in the following manner: the second lens unit L2 moves toward the image side such that the distance between the second lens unit L2 and the first lens unit L1 is increased; the third lens unit L3 moves along a locus that is convex toward the image side and such that the distance between the third lens unit L3 and the second lens unit L2 is reduced; and the first lens unit L1 and the fourth lens unit L4 are stationary. During focusing from the object at infinity to the near object, the third lens unit L3 moves toward the image side.

In the fourth embodiment illustrated in FIG. 10, during zooming from the wide-angle end to the telephoto end, the lens units move as represented by the respective arrows in the following manner: the second lens unit L2 moves toward the image side such that the distance between the second lens unit L2 and the first lens unit L1 is increased; the third lens unit L3 moves toward the image side such that the distance between the third lens unit L3 and the second lens unit L2 is increased; and the fourth lens unit L4 moves along a locus that is convex toward the object side and such that the distance between the fourth lens unit L4 and the third lens unit L3 is reduced. During focusing from the object at infinity to the near object, the fourth lens unit L4 moves toward the image side.

As described above, in each of the embodiments, focusing is performed by using the focusing lens unit Lf having a positive refractive power and provided on the object side of the imaging lens unit Lr having a positive refractive power and provided nearest to the image-side end.

Features of the individual embodiments will now be described. The zoom lenses according to the respective embodiments each include the imaging lens unit Lr having a positive refractive power and provided nearest to the image-side end, and the focusing lens unit Lf having a positive refractive power and provided on the object side of the imaging lens unit Lr. Focusing is performed by using the focusing lens unit Lf. The imaging lens unit Lr includes a negative meniscus lens component Rn provided nearest to the object-side end and being concave on the object side thereof.

In each of the embodiments, focusing is performed by moving the focusing lens unit Lf, which is of small size and has a light weight, in the direction of the optical axis. In this method, variations in aberrations, in particular, variations in spherical aberration, caused by the movement of the focusing lens unit Lf tend to be large, resulting in deterioration of imaging performance.

A major reason for the above phenomenon is that large negative spherical aberration occurs in the focusing lens unit Lf, which is a focusing lens unit and has a positive refractive power. In each of the embodiment, as the distance to the object is reduced during focusing, the focusing lens unit moves toward the image side. In such a case, since the height of incidence of an axial light beam on the focusing lens unit is small, negative spherical aberration is reduced. Consequently, spherical aberration of the lens system as a whole becomes overcorrected. In reducing the spherical aberration that occurs in the focusing lens unit, simply reducing the range of variations in spherical aberration worsens the balance of aberrations that occur in the lens system as a whole.

Hence, in each of the embodiments, the negative meniscus lens component Rn that is concave on the object side thereof is provided at a position of the imaging lens unit Lr that is nearest to the object-side end, the imaging lens unit Lr being provided on the image side of the focusing lens unit Lf, which is a focusing lens unit. The negative meniscus lens component Rn causes high-order spherical aberration, which improves the balance of correction of aberrations, whereby spherical aberration of the lens system as a whole is corrected in a good manner. Accordingly, variations in aberrations that occur in the inner focusing method are reduced. Consequently, variations in aberrations during focusing are reduced, and aberrations that occur in the lens system as a whole are corrected in a good manner.

In each of the embodiments, the zoom lens may satisfy one or more of the following conditional expressions:

$$-1.5 < fRn/ft < -0.5 \quad (1)$$

$$-8.0 < (Rnf+Rnr)/(Rnf-Rnr) < -2.0 \quad (2)$$

$$0.1 < fLf/ft < 0.6 \quad (3)$$

$$0.35 < fLr/ft < 0.75 \quad (4)$$

$$0.3 < f1/ft < 0.6 \quad (5)$$

where ft denotes the focal length of the lens system as a whole at the telephoto end; fRn denotes the focal length of the negative meniscus lens component Rn; Rnf and Rnr denote the radii of curvature of an object-side surface and an image-side surface, respectively, of the negative meniscus lens component Rn; fLf denotes the focal length of the focusing lens unit Lf; fLr denotes the focal length of the imaging lens unit Lr; and f1 denotes the focal length of the first lens unit L1.

The technical meanings of the above conditional expressions will now be described.

Conditional Expression (1) defines the focal length of the negative meniscus lens component Rn included in the imaging lens unit Lr. Since the negative meniscus lens component Rn has a negative refractive power, the positive refractive power of the focusing lens unit Lf functioning as a focusing lens unit is increased. Consequently, the length of travel of the focusing lens unit Lf during focusing is reduced, and quick focusing is easily realized.

If the upper limit of Conditional Expression (1) is exceeded, large high-order spherical aberration occurs in the negative meniscus lens component Rn, worsening the balance of spherical aberration of the lens system as a whole. If the lower limit of Conditional Expression (1) is exceeded, it becomes difficult to increase the positive refractive power of the focusing lens unit Lf functioning as a focusing lens unit. Consequently, the length of travel of the focusing lens unit Lf during focusing increases, making it difficult to reduce the size of the lens system as a whole and to realize quick focusing.

As described above, in each of the zoom lenses according to the embodiments of the present invention, high-order spherical aberration is caused by using the negative meniscus lens component Rn, whereby spherical aberration of the lens system as a whole is corrected in a good balance.

If the upper limit of Conditional Expression (2) is exceeded, spherical aberration of the lens system as a whole becomes undercorrected. In contrast, if the lower limit of Conditional Expression (2) is exceeded, spherical aberration of the lens system as a whole becomes overcorrected.

Conditional Expression (3) defines the focal length of the focusing lens unit Lf functioning as a focusing lens unit. If the upper limit of Conditional Expression (3) is exceeded, the length of travel of the focusing lens unit Lf during focusing increases, making it difficult to reduce the size of the lens system as a whole. If the lower limit of Conditional Expression (3) is exceeded, variations in spherical aberration during focusing increase. Moreover, it becomes difficult to correct astigmatism at all zooming positions.

Conditional Expression (4) defines the focal length of the imaging lens unit Lr provided nearest to the image-side end. If the upper limit of Conditional Expression (4) is exceeded, the refractive power of the imaging lens unit Lr functioning as an imaging lens unit becomes too weak, making it difficult to reduce the size of the lens system as a whole. If the lower limit of Conditional Expression (4) is exceeded, it becomes difficult to correct spherical aberration at the telephoto end and to provide a sufficient back focal length.

Conditional Expression (5) defines the focal length of the first lens unit L1, which is stationary during zooming. If the upper limit of Conditional Expression (5) is exceeded, it becomes difficult to realize a telephoto power arrangement, increasing the total length of the zoom lens and making it difficult to reduce the f-number at the telephoto end. If the lower limit of Conditional Expression (5) is exceeded, it becomes difficult to correct spherical aberration at the telephoto end. The ranges of Conditional Expressions (1) to (5) may be set as follows:

$$-1.3 < fRn/ft < -0.60 \quad (1a)$$

$$-0.70 < (Rnf+Rnr)/(Rnf-Rnr) < -2.5 \quad (2a)$$

$$0.15 < fLf/ft < 0.55 \quad (3a)$$

$$0.40 < fLr/ft < 0.70 \quad (4a)$$

$$0.35 < f1/ft < 0.55 \quad (5a)$$

According to each of the above embodiments, a zoom lens that includes a small and light focusing lens unit and has high optical performance at all zooming positions and at all object distances is provided.

In each of the embodiments, the imaging lens unit Lr may include two or more positive lens components and one or more negative lens component on the image side of the negative meniscus lens component Rn. Such a configuration facilitates the correction of aberrations at all zooming positions. The imaging lens unit Lr may include the sub-lens unit IS having a negative refractive power and being movable in a direction containing a component that is perpendicular to the optical axis. Thus, the sub-lens unit IS can move the image in the direction perpendicular to the optical axis. In such a case, the sub-lens unit IS may include at least a positive lens component and a negative lens components. In such a configuration, it becomes easy to maintain good optical performance while eccentric aberration that may occur during image stabilization is reduced.

Numerical Examples 1 to 4 corresponding to the first to fourth embodiments, respectively, are given below. In each of Numerical Examples 1 to 4, i denotes the order of the surface counted from the object side; ri denotes the radius of curvature of the i-th surface; di denotes the distance between the i-th surface and the i+1-th surface; ndi and vdi denote the refractive index and the Abbe number, respectively, with respect to d-line; f denotes the focal length; and Fno denotes the f-number. Table summarizes the relationships between Conditional Expressions (1) to (5) given above and values in Numerical Examples 1 to 4.

Numerical Example 1

| Unit: mm | | | | |
|---|---|---|---|---|
| Data on surfaces | | | | |
| Surface number | r | d | nd | vd |
| 1 | 304.523 | 8.18 | 1.48749 | 70.2 |
| 2 | −995.270 | 0.30 | | |
| 3 | 299.608 | 3.55 | 1.80610 | 33.3 |
| 4 | 127.056 | 0.11 | | |
| 5 | 127.916 | 12.01 | 1.43387 | 95.1 |
| 6 | 3689.033 | 0.60 | | |
| 7 | 121.187 | 11.07 | 1.49700 | 81.5 |
| 8 | 940.122 | (Variable) | | |
| 9 | 156.683 | 6.55 | 1.90366 | 31.3 |
| 10 | −99.068 | 2.30 | 1.69680 | 55.5 |
| 11 | 80.494 | 3.13 | | |
| 12 | 484.750 | 2.10 | 1.69680 | 55.5 |
| 13 | 50.530 | 5.44 | 1.90366 | 31.3 |
| 14 | 296.439 | 2.13 | | |
| 15 | −162.586 | 2.00 | 1.83481 | 42.7 |
| 16 | 90.078 | 5.16 | | |
| 17 | −74.594 | 1.95 | 1.83481 | 42.7 |
| 18 | 1002.741 | (Variable) | | |
| 19 | −1011.591 | 4.17 | 1.49700 | 81.5 |
| 20 | −102.784 | 0.15 | | |
| 21 | 166.682 | 4.46 | 1.49700 | 81.5 |
| 22 | −252.883 | 0.15 | | |
| 23 | 82.478 | 2.20 | 1.90366 | 31.3 |
| 24 | 53.249 | 6.69 | 1.49700 | 81.5 |
| 25 | 1002.511 | (Variable) | | |
| 26 | −66.142 | 2.00 | 1.76182 | 26.5 |
| 27 | −97.821 | 17.76 | | |
| 28 | 100.873 | 5.95 | 1.59282 | 68.6 |
| 29 | −129.007 | 4.26 | | |
| 30 (Stop) | ∞ | 22.22 | | |
| 31 | 139.482 | 3.17 | 1.80610 | 33.3 |
| 32 | −139.482 | 1.55 | 1.51633 | 64.1 |
| 33 | 58.064 | 3.26 | | |
| 34 | −132.762 | 1.50 | 1.65160 | 58.5 |
| 35 | 71.537 | 3.70 | | |
| 36 | 81.433 | 4.06 | 1.62299 | 58.2 |
| 37 | −120.683 | 0.15 | | |
| 38 | 171.142 | 3.06 | 1.62299 | 58.2 |
| 39 | −122.747 | 1.10 | | |
| 40 | −65.336 | 1.60 | 1.80610 | 33.3 |
| 41 | 425.477 | 46.14 | | |
| 42 | 66.116 | 7.38 | 1.57501 | 41.5 |
| 43 | −109.030 | 2.00 | 1.88300 | 40.8 |
| 44 | 374.168 | 67.61 | | |
| Image plane | ∞ | | | |

-continued

Unit: mm

Other data
Zoom ratio 1.90

|  | Wide angle | Intermediate | Telephoto |
|---|---|---|---|
| Focal length | 205.00 | 298.89 | 389.98 |
| F-number | 4.12 | 4.12 | 4.12 |
| Angle of view | 6.02 | 4.14 | 3.18 |
| Image height | 21.64 | 21.64 | 21.64 |
| Total lens length | 389.92 | 389.92 | 389.92 |
| Back focal length | 67.61 | 67.61 | 67.61 |
| d8 | 43.16 | 66.96 | 78.16 |
| d18 | 25.58 | 14.05 | 3.10 |
| d25 | 38.30 | 26.03 | 25.79 |

Data on lens units

| Unit | First surface number | Focal length |
|---|---|---|
| 1 | 1 | 191.93 |
| 2 | 9 | −41.44 |
| 3 | 19 | 81.74 |
| 4 | 26 | 213.59 |

Numerical Example 2

Unit: mm

Data on surfaces

| Surface number | r | d | nd | νd |
|---|---|---|---|---|
| 1 | 247.326 | 8.80 | 1.48749 | 70.2 |
| 2 | −1567.532 | 0.30 | | |
| 3 | 328.296 | 3.55 | 1.80610 | 33.3 |
| 4 | 134.269 | 0.11 | | |
| 5 | 135.763 | 11.29 | 1.43387 | 95.1 |
| 6 | ∞ | 0.60 | | |
| 7 | 129.230 | 9.92 | 1.49700 | 81.5 |
| 8 | 717.102 | (Variable) | | |
| 9 | 132.013 | 6.79 | 1.90366 | 31.3 |
| 10 | −104.139 | 2.30 | 1.69680 | 55.5 |
| 11 | 75.596 | 3.65 | | |
| 12 | 784.914 | 2.10 | 1.69680 | 55.5 |
| 13 | 55.155 | 4.94 | 1.90366 | 31.3 |
| 14 | 333.601 | 2.20 | | |
| 15 | −146.679 | 2.00 | 1.83481 | 42.7 |
| 16 | 82.382 | 5.54 | | |
| 17 | −70.878 | 1.95 | 1.83481 | 42.7 |
| 18 | −654.155 | (Variable) | | |
| 19 | 502.523 | 4.49 | 1.59282 | 68.6 |
| 20 | −111.266 | 0.15 | | |
| 21 | 88.152 | 2.20 | 1.90366 | 31.3 |
| 22 | 50.280 | 7.88 | 1.59282 | 68.6 |
| 23 | −534.970 | (Variable) | | |
| 24 | −66.739 | 2.00 | 1.61545 | 43.0 |
| 25 | −363.217 | 4.29 | 1.59282 | 68.6 |
| 26 | −113.410 | 2.09 | | |
| 27 | 78.698 | 7.24 | 1.59282 | 68.6 |
| 28 | −153.527 | 10.65 | | |
| 29 (Stop) | ∞ | 19.38 | | |
| 30 | 313.357 | 2.73 | 1.80610 | 33.3 |
| 31 | −110.907 | 1.55 | 1.51633 | 64.1 |
| 32 | 73.513 | 2.83 | | |
| 33 | −126.007 | 1.50 | 1.65160 | 58.5 |
| 34 | 76.373 | 4.13 | | |
| 35 | 127.851 | 3.34 | 1.58913 | 61.1 |
| 36 | −121.150 | 0.15 | | |
| 37 | 82.507 | 4.21 | 1.62299 | 58.2 |
| 38 | −113.830 | 1.15 | | |
| 39 | −61.636 | 1.60 | 1.80610 | 33.3 |
| 40 | 241.972 | 55.75 | | |
| 41 | 82.944 | 6.82 | 1.58144 | 40.8 |

-continued

Unit: mm

| 42 | −106.718 | 2.00 | 1.88300 | 40.8 |
|---|---|---|---|---|
| 43 | −397.505 | 67.3 | | |
| Image plane | ∞ | | | |

Other data
Zoom ratio 1.90

|  | Wide angle | Intermediate | Telephoto |
|---|---|---|---|
| Focal length | 205.00 | 294.31 | 389.98 |
| F-number | 4.12 | 4.12 | 4.12 |
| Angle of view | 6.02 | 4.20 | 3.18 |
| Image height | 21.64 | 21.64 | 21.64 |
| Total lens length | 392.00 | 392.00 | 392.00 |
| Back focal length | 67.3 | 67.3 | 67.3 |
| d8 | 48.66 | 71.41 | 83.66 |
| d18 | 24.19 | 13.37 | 1.97 |
| d23 | 37.67 | 25.75 | 24.90 |

Data on lens units

| Unit | First surface number | Focal length |
|---|---|---|
| 1 | 1 | 199.38 |
| 2 | 9 | −41.70 |
| 3 | 19 | 85.59 |
| 4 | 24 | 176.45 |

Numerical Example 3

Unit: mm

Data on surfaces

| Surface number | r | d | nd | νd |
|---|---|---|---|---|
| 1 | 102.374 | 2.10 | 1.69895 | 30.1 |
| 2 | 54.694 | 7.66 | 1.49700 | 81.5 |
| 3 | 1142.851 | 0.15 | | |
| 4 | 78.378 | 5.21 | 1.49700 | 81.5 |
| 5 | 956.143 | 0.15 | | |
| 6 | 102.518 | 3.78 | 1.49700 | 81.5 |
| 7 | 1046.674 | (Variable) | | |
| 8 | −518.786 | 1.20 | 1.80400 | 46.6 |
| 9 | 33.781 | 5.05 | | |
| 10 | −48.355 | 1.25 | 1.49700 | 81.5 |
| 11 | 41.605 | 3.77 | 1.84666 | 23.9 |
| 12 | −309.312 | 0.99 | | |
| 13 | −74.468 | 1.25 | 1.80440 | 39.6 |
| 14 | 3967.758 | (Variable) | | |
| 15 | 66.778 | 1.40 | 1.74950 | 35.3 |
| 16 | 28.844 | 6.62 | 1.59522 | 67.7 |
| 17 | −95.386 | (Variable) | | |
| 18 | −37.947 | 1.50 | 1.72047 | 34.7 |
| 19 | −53.052 | 1.00 | | |
| 20 (Stop) | ∞ | 0.34 | | |
| 21 | 43.615 | 4.78 | 1.83481 | 42.7 |
| 22 | −513.808 | 9.75 | | |
| 23 | 95.951 | 2.16 | 1.74950 | 35.3 |
| 24 | 19.018 | 6.21 | 1.49700 | 81.5 |
| 25 | −409.870 | 2.00 | | |
| 26 | 184.404 | 3.09 | 1.84666 | 23.9 |
| 27 | −69.455 | 1.20 | 1.69680 | 55.5 |
| 28 | 84.028 | 0.97 | | |
| 29 | −1400.736 | 1.30 | 1.71300 | 53.9 |
| 30 | 48.742 | 6.31 | | |
| 31 | 219.461 | 7.39 | 1.48749 | 70.2 |
| 32 | −22.696 | 2.04 | 1.74950 | 35.3 |
| 33 | −66.638 | 1.01 | | |
| 34 | 82.668 | 2.96 | 1.83400 | 37.2 |
| 35 | 537.134 | 72.36 | | |
| Image plane | ∞ | | | |

-continued

Unit: mm

Other data
Zoom ratio 2.69

|  | Wide angle | Intermediate | Telephoto |
|---|---|---|---|
| Focal length | 72.00 | 133.08 | 193.99 |
| F-number | 4.12 | 4.12 | 4.12 |
| Angle of view | 16.72 | 9.23 | 6.36 |
| Image height | 21.64 | 21.64 | 21.64 |
| Total lens length | 214.00 | 214.00 | 214.00 |
| Back focal length | 72.36 | 72.36 | 72.36 |
| d7 | 2.37 | 21.02 | 27.92 |
| d14 | 30.45 | 15.63 | 0.88 |
| d17 | 14.23 | 10.39 | 18.25 |

Data on lens units

| Unit | First surface number | Focal length |
|---|---|---|
| 1 | 1 | 79.55 |
| 2 | 8 | −26.63 |
| 3 | 15 | 83.66 |
| 4 | 18 | 116.05 |

Numerical Example 4

Unit: mm

Data on surfaces

| Surface number | r | d | nd | vd |
|---|---|---|---|---|
| 1 | 306.910 | 7.87 | 1.48749 | 70.2 |
| 2 | −1194.116 | 0.30 | | |
| 3 | 238.395 | 3.55 | 1.80610 | 33.3 |
| 4 | 112.398 | 0.75 | | |
| 5 | 119.342 | 11.19 | 1.43387 | 95.1 |
| 6 | 656.834 | 0.60 | | |
| 7 | 113.538 | 12.03 | 1.49700 | 81.5 |
| 8 | 1176.463 | (Variable) | | |
| 9 | 328.086 | 5.48 | 1.90366 | 31.3 |
| 10 | −94.381 | 2.30 | 1.69680 | 55.5 |
| 11 | 60.347 | (Variable) | | |
| 12 | 72.820 | 2.10 | 1.69680 | 55.5 |
| 13 | 36.440 | 6.51 | 1.90366 | 31.3 |
| 14 | 111.939 | 2.01 | | |
| 15 | 5564.884 | 2.00 | 1.83481 | 42.7 |
| 16 | 84.009 | 5.67 | | |
| 17 | −67.335 | 1.95 | 1.83481 | 42.7 |
| 18 | 301.240 | (Variable) | | |
| 19 | 1269.777 | 4.63 | 1.49700 | 81.5 |
| 20 | −92.392 | 0.15 | | |
| 21 | 84.456 | 2.20 | 1.90366 | 31.3 |
| 22 | 54.991 | 7.74 | 1.49700 | 81.5 |
| 23 | −300.790 | (Variable) | | |
| 24 | −56.172 | 2.00 | 1.76182 | 26.5 |
| 25 | −80.018 | 0.20 | | |
| 26 | 73.308 | 8.99 | 1.59282 | 68.6 |
| 27 | −148.746 | 11.02 | | |
| 28 (Stop) | ∞ | 19.88 | | |
| 29 | 162.007 | 2.86 | 1.80610 | 33.3 |
| 30 | −162.007 | 1.55 | 1.51633 | 64.1 |
| 31 | 58.638 | 3.21 | | |
| 32 | −136.518 | 1.50 | 1.65160 | 58.5 |
| 33 | 74.304 | 4.93 | | |
| 34 | 101.244 | 5.71 | 1.62299 | 58.2 |
| 35 | −50.783 | 0.92 | | |
| 36 | −39.765 | 1.60 | 1.80610 | 33.3 |
| 37 | −86.503 | 44.11 | | |
| 38 | 66.406 | 8.17 | 1.57501 | 41.5 |
| 39 | −85.296 | 2.00 | 1.88300 | 40.8 |
| 40 | 901.007 | (Variable) | | |
| Image plane | ∞ | | | |

Other data
Zoom ratio 1.90

|  | Wide angle | Intermediate | Telephoto |
|---|---|---|---|
| Focal length | 205.00 | 300.75 | 389.98 |
| F-number | 4.12 | 4.12 | 4.12 |
| Angle of view | 6.02 | 4.11 | 3.18 |
| Image height | 21.64 | 21.64 | 21.64 |
| Total lens length | 390.73 | 390.73 | 390.73 |
| Back focal length | 71.26 | 71.26 | 71.26 |
| d8 | 48.26 | 70.15 | 80.31 |
| d11 | 3.97 | 8.56 | 10.87 |
| d18 | 27.12 | 15.66 | 5.25 |
| d23 | 42.45 | 27.42 | 25.37 |
| d40 | 71.26 | 71.26 | 71.26 |

TABLE

| Conditional Expression | Numerical Example 1 | Numerical Example 2 | Numerical Example 3 | Numerical Example 4 |
|---|---|---|---|---|
| (1) | −0.71 | −0.69 | −0.99 | −0.66 |
| (2) | −5.18 | −3.86 | −6.02 | −5.71 |
| (3) | 0.21 | 0.22 | 0.43 | 0.24 |
| (4) | 0.55 | 0.45 | 0.60 | 0.47 |
| (5) | 0.49 | 0.51 | 0.41 | 0.50 |

An embodiment in which the zoom lens according to any of the above embodiments of the present invention is used as an imaging optical system will now be described with reference to FIG. 13. FIG. 13 illustrates a body 10 of a single-lens reflex camera with an interchangeable lens 11 to which the zoom lens according to any of the embodiments of the present invention is applied. A photosensitive surface 12 corresponds to a silver-halide film, a solid-state image pickup device (photoelectric conversion device), or the like. An image of an object obtained through the interchangeable lens 11 is to be recorded on the silver-halide film or is to be received by the solid-state image pickup device. The image of the object obtained through the interchangeable lens 11 is viewed through a finder optical system 13. The image of the object obtained through the interchangeable lens 11 is switchably transmitted to either the photosensitive surface 12 and the finder optical system 13 via a quick return mirror 14 that is turnable.

When an image of an object is to be viewed in a finder, the image of the object formed on a focusing screen 15 via the quick return mirror 14 is converted into an erect image by a pentagonal prism 16 and is magnified by an eyepiece optical system 17, whereby the magnified image is viewed. When image shooting is performed, the quick return mirror 14 turns in the direction of the arrow. Thus, the image of the object is formed and recorded on the photosensitive surface 12.

By applying the zoom lens according to any of the embodiments of the present invention to an optical apparatus such as an interchangeable lens of a single-lens reflex camera as described above, an optical apparatus having high optical performance is provided. The embodiments of the present invention are also applicable in a similar manner to a single-lens reflex camera not including a quick return mirror. The zoom lenses according to the embodiments of the present invention is also applicable in a similar manner to a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-030668 filed Feb. 15, 2012, which is hereby incorporated by reference herein in its entirety.

What is claimed is:

1. A zoom lens comprising:
an imaging lens unit having a positive refractive power and provided nearest to an image-side end; and
a focusing lens unit having a positive refractive power and provided on an object side of the imaging lens unit,
wherein a distance between the imaging lens unit and the focusing lens unit changes during zooming,
wherein the focusing lens unit moves during focusing, and
wherein the imaging lens unit includes, at a position thereof nearest to an object-side end, a negative meniscus lens component whose concave surface faces the object side,
wherein there are air gaps on both sides of the negative meniscus lens component, between the negative meniscus lens component and neighboring lens components of the zoom lens.

2. The zoom lens according to claim 1 further comprising, on the object side of the focusing lens unit and in order from the object side to an image side:
a first lens unit having a positive refractive power; and
a second lens unit having a negative refractive power,
wherein, during zooming from a wide-angle end to a telephoto end, the second lens unit moves toward the image side and the focusing lens unit moves along a locus that is convex toward the image side.

3. The zoom lens according to claim 1 further comprising, on the object side of the focusing lens unit and in order from the object side to an image side:
a first lens unit having a positive refractive power;
a second lens unit having a negative refractive power; and
a third lens unit having a negative refractive power,
wherein, during zooming from a wide-angle end to a telephoto end, the second lens unit and the third lens unit move toward the image side along respectively different loci while the focusing lens unit moves along a locus that is convex toward the image side.

4. The zoom lens according to claim 1 satisfying the following conditional expression:

$$-1.5 < fRn/ft < -0.5$$

where ft denotes a focal length of the zoom lens as a whole at a telephoto end, and fRn denotes a focal length of the negative meniscus lens component.

5. The zoom lens according to claim 1 satisfying the following conditional expression:

$$-8.0 < (Rnf+Rnr)/(Rnf-Rnr) < -2.0$$

where Rnf and Rnr denote radii of curvature of an object-side surface and an image-side surface, respectively, of the negative meniscus lens component.

6. The zoom lens according to claim 1 satisfying the following conditional expression:

$$0.1 < fLf/ft < 0.6$$

where ft denotes a focal length of the zoom lens as a whole at a telephoto end, and fLf denotes a focal length of the focusing lens unit.

7. The zoom lens according to claim 1, wherein the imaging lens unit includes at least two positive lens components and at least one negative lens component on an image side of the negative meniscus lens component.

8. The zoom lens according to claim 1, wherein the imaging lens unit includes a sub-lens unit (IS) having a negative refractive power and being movable in a direction containing a component that is perpendicular to an optical axis and in such a manner as to move an image forming position in a direction perpendicular to the optical axis.

9. The zoom lens according to claim 1 satisfying the following conditional expression:

$$0.35 < fLr/ft < 0.75$$

where fLr denotes a focal length of the imaging lens unit, and ft denotes a focal length of the zoom lens as a whole at a telephoto end.

10. The zoom lens according to claim 1 further comprising, on the object side of the focusing lens unit and in order from the object side to an image side:
a first lens unit having a positive refractive power; and
a second lens unit having a negative refractive power,
wherein the zoom lens satisfies the following conditional expression:

$$0.3 < f1/ft < 0.6$$

where f1 denotes a focal length of the first lens unit, and ft denotes a focal length of the zoom lens as a whole at a telephoto end.

11. An image pickup apparatus comprising:
a zoom lens; and
a solid-state image pickup device that receives light of an image formed by the zoom lens,
wherein the zoom lens comprising,
an imaging lens unit having a positive refractive power and provided nearest to an image-side end; and
a focusing lens unit having a positive refractive power and provided on an object side of the imaging lens unit,
wherein a distance between the imaging lens unit and the focusing lens unit changes during zooming,
wherein the focusing lens unit moves during focusing, and
wherein the imaging lens unit includes, at a position thereof nearest to an object-side end, a negative meniscus lens component whose concave surface faces the object side,
wherein there are air gaps on both sides of the negative meniscus lens component, between the negative meniscus lens component and neighboring lens components of the zoom lens.

12. A zoom lens comprising: in order from an object side to an image side,
a first lens unit having a positive refractive power; and
a second lens unit having a negative refractive power,
the zoom lens further comprising: in order from an object side to an image side,
an imaging lens unit having a positive refractive power and provided nearest to an image-side end; and
a focusing lens unit having a positive refractive power and provided on an object side of the imaging lens unit,
wherein each distance between adjacent lens units changes during zooming,
wherein the focusing lens unit moves during focusing, and
wherein the imaging lens unit includes, at a position thereof nearest to an object-side end, a negative meniscus lens component whose concave surface faces the object side, and wherein, during zooming from a wide-angle end to a telephoto end, the second lens unit moves toward the image side and the focusing lens unit moves along a locus that is convex toward the image side.

13. A zoom lens comprising: in order from an object side to an image side,
a first lens unit having a positive refractive power,
a second lens unit having a negative refractive power, and
a third lens unit having a negative refractive power,
the zoom lens further comprising: in order from an object side to an image side,
an imaging lens unit having a positive refractive power and provided nearest to an image-side end; and
a focusing lens unit having a positive refractive power and provided on an object side of the imaging lens unit,
wherein each distance between adjacent lens units changes during zooming,
wherein the focusing lens unit moves during focusing, and
wherein the imaging lens unit includes, at a position thereof nearest to an object-side end, a negative meniscus lens component whose concave surface faces the object side, and
wherein, during zooming from a wide-angle end to a telephoto end, the second lens unit and the third lens unit move toward the image side and the focusing lens unit moves along a locus that is convex toward the image side.

* * * * *